(12) United States Patent
Zeng et al.

(10) Patent No.: US 7,584,181 B2
(45) Date of Patent: Sep. 1, 2009

(54) IMPLICIT LINKS SEARCH ENHANCEMENT SYSTEM AND METHOD FOR SEARCH ENGINES USING IMPLICIT LINKS GENERATED BY MINING USER ACCESS PATTERNS

(75) Inventors: Hua-Jun Zeng, Beijing (CN); Gui-Rong Xue, Shanghai (CN); Zheng Chen, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 991 days.

(21) Appl. No.: 10/676,794

(22) Filed: Sep. 30, 2003

(65) Prior Publication Data

US 2005/0071465 A1 Mar. 31, 2005

(51) Int. Cl.
*G06F 7/00* (2006.01)
*G06F 17/30* (2006.01)
(52) U.S. Cl. ................................. 707/5; 707/7; 709/224
(58) Field of Classification Search ................ 707/1–10, 707/100–104.1; 715/513, 206–208, 738, 715/741, 815; 709/224
See application file for complete search history.

(56) References Cited

OTHER PUBLICATIONS

Talagala et al., Usage patterns of a Web-based image collection, Mar. 15-18, 1999, IEEE, 203-214.*
Yu et al., Improving pseudo-relevance feedback in web information retrieval using web page segmentation, May 2003, 11-18.*
Gui-Rong Xue et al., Implicit Link Analysis for Small Web Search, Aug. 1, 2003, ACM, 56-63.*
Agrawal R. and Srikant R., "Mining sequential patterns" In *Proc. of ICDE'95*, 3-14 Taiwan, Mar. 1995.
Berkhin P., Becher J. D. and Randall D. J., "Interactive path analysis of web site traffic" In *Proc. of the 7th SIGKDD*, 414-419, San Francisco, California, 2001.
Brin S. and Page L., "The anatomy of a large-scale hypertextual web search engine" In *Proc. of WWW7*, 107-117, Brisbane, Australia, Apr. 1998.
Cooley R., Mobasher B. and Srivastava J., "Data preparation for mining World Wide Web browsing patterns" in *Knowledge and Information Systems*, 1(1):5-32, 1999.
Cooley R., Tan P.-N. and Srivastava J., "Discovery of interesting usage patterns from web data" In *Proc. of WEBKDD'99*, 163-182, Aug. 1999.

(Continued)

*Primary Examiner*—Jean B Fleurantin
(74) *Attorney, Agent, or Firm*—Lyon & Harr, L.L.P.; Craig S. Fischer

(57) ABSTRACT

An implicit links enhancement system and method for search engines that generates implicit links obtained from mining user access logs to facilitate enhanced local searching of web sites and intranets. The implicit links search enhancement system and method includes extracting implicit links by mining users' access patterns and then using a modified link analysis algorithm to re-rank search results obtained from traditional search engines. More specifically, the implicit links search enhancement method includes extracting implicit links from a user access log, generating an implicit links graph from the extracted implicit links, and computing page rankings using the implicit links graph. The implicit links are extracted from the log using a two-item sequential pattern mining technique. Search results obtained from a search engine are re-ranked based on an implicit links analysis performed using an updated implicit links graph, a modified re-ranking formula, and at least one re-ranking technique.

19 Claims, 16 Drawing Sheets

OTHER PUBLICATIONS

Hawking D., Voorhees E., Bailey P. and Craswell N., "Overview of TREC-8 web track" In *Proc. of TREC-8*, 131-150, Gaithersburg MD, Nov. 1999.

Kleinberg J. M., "Authoritative sources in a hyperlinked environment" *Journal of the ACM*, 46(5):604-632, 1999.

Miller J. C., Rae G. and Schaefer F., "Modifications of Kleinberg's HITS algorithm using matrix exponentiation and web log records" In *Proc. of SIGIR'01*, 444-445, New Orleans, Sep. 2001.

Nakayama T., Kato H. and Yamane Y., "Discovering the gap between web site designers' expectations and users' behavior" In *Proc. of WWW9*, Amsterdam, May 2000.

Page L., Brin S., Motwani R. and Winograd T., "The PageRank citation ranking: bringing order to the Web" *Technical report*, Stanford University Database Group, 1998.; pp. 1-17.

Pei J., Han J., Mortazavi-asl B., and Zhu H., "Mining access patterns efficiently from web logs" In *Proc. of PAKDD'00*, 396-407, Kyoto, Apr. 2000.

Robertson S. E., Walker S., Beaulieu M. M., and Gatford M., Payne A. "1995. Okapi at TREC-4" In *Proc. of TREC-4*, 73-96, NIST Special Publication 500-236, Oct. 1996.

Yang Q., Zhang H. H. and Li T., "Mining web logs for prediction models in WWW caching and prefetching" In *Proc. of KDD'01*, 473-478, Aug. 2001.

* cited by examiner

IMPLICIT LINKS SEARCH ENHANCEMENT SYSTEM AND METHOD FOR SEARCH ENGINES USING IMPLICIT LINKS GENERATED BY MINING USER ACCESS PATTERNS

TECHNICAL FIELD

The present invention relates in general to computer search engines and more particularly to an implicit links enhancement system and method for search engines that generates implicit links obtained from mining user access logs to provide accurate and efficient local searching of web sites and intranets.

BACKGROUND OF THE INVENTION

Search engines are vital for helping a user find specific information in the vast expanse of the World Wide Web (WWW or Web). Because the Web continues to grow at a phenomenal rate, it would be virtually impossible to locate anything on the Web without knowing a specific address if not for search engines. Generally, a search engine refers to a system that maintains an index structure of a collection of documents to efficiently generate a list of documents that contain specified keywords and ranks the document list according to a relevance measurement. Global search engines, which are popular and widespread, are used to search the entire Web, while local search engines are used to search web sites and intranets.

Many types of popular and effective global search engines use link analysis to quickly and efficiently search the entire Web. These search engines analyze links to rank web sites (or pages) according to, among other things, the quality and quantity of other sites that are linked to them. In general, a link (in a hypertext context such as the Web) is a reference to another page or site. When a user clicks on a link within a site, the user is taken to the other site. In theory, the more sites that link are linked to a certain site, the higher ranking the search engine will give the particular web site because more links indicates a higher level of popularity among users.

Link analysis is widely used to analyze the importance of a page. One technique, called HITS, is described in a paper by J. M. Kleinberg entitled "Authoritative sources in a hyperlinked environment" in *Journal of the ACM*, 46(5):604-632, 1999. Another useful technique is called PageRank. PageRank is describe in a paper by L. Page, S. Brin, R. Motwani and T. Winograd entitled "The PageRank citation ranking: bringing order to the Web" in a Technical report, Stanford University Database Group, 1998 and in a paper by S. Brin and L. Page entitled "The anatomy of a large-scale hypertextual web search engine" in *Proc. of WWW7*, 107-117, Brisbane, Australia, April 1998.

In both the HITS and PageRank techniques, the Web is represented a directed graph G={V, E}, where V stands for web-pages $w_i$, and E stands for the hyperlinks $I_{i,j}$ within two pages. For the HITS technique, each web-page $w_i$ has both a hub score $h_i$ and an authority score $a_i$. The hub score of $w_i$ is the sum of all the authority scores of pages that are pointed by $w_i$; the authority score of $w_i$ is the sum of all the hub scores of pages that point to $w_i$, as shown in the following equations.

$$a_i = \sum_{j:l_{j,i} \in E} h_j, \quad h_i = \sum_{j:l_{i,j} \in E} a_j$$

The final authority and hub scores of every web page are obtained through an iterative update process.

PageRank is a core algorithm of the popular Google search engine (http://www.google.com.). PageRank measures the importance of web pages. specifically, PageRank uses the whole linkage graph of the Web to compute universal query-independent rank value for each page. A users' browsing model is modeled as a random surfing model. This model assumes that a user either follows a link from a current page or jumps to a random page in the graph. The PageRank of a page $w_i$ then is computed by the following equation:

$$PR(w_i) = \frac{\varepsilon}{n} + (1-\varepsilon) \times \sum_{l_{j,i} \in E} PR(w_j) / outdegree(w_j)$$

where $\varepsilon$ is a dampening factor, which is usually set between 0.1 and 0.2, n is the number of nodes in G, and out-degree($w_j$) is the number of the edges leaving page $w_j$ (i.e., the number of hyperlinks on page $w_j$). The PageRank can be computed by an iterative algorithm and corresponds to the primary eigenvector of a matrix derived from adjacency matrix of the available portion of the Web.

Although these global search engines work relatively well for searching the Web, they are unavailable for local searches, such as searches of a web site or an intranet. A web site can be thought of as a closed space on the web where data and information are available to a user. For example, web sites include enterprise portals (allowing document access and product information), server providers (including access to news and magazines), education institutions providing online courses and document access, and user groups, to name a few. Frequently, to obtain specific and up-to-date information, a user will often go directly to a specific web site and conduct site search. However, in addition to being unavailable for local searches, global search engines are also impractical for local searching because the link structure of a web site and intranet is different from the Web. In the closed sub-space of a web site or intranet local search engines must used.

Existing local (or small web) search engines generally use the same link analysis technology as those used in global search engines. However, their performances are problematic. As reported in a paper by P. Hagen, H. Manning and Y. Paul entitled "Must search stink? The Forrester report" in *Forrester*, June 2000, current site-specific search engines fail to deliver all the relevant content, instead returning too much irrelevant content to meet the user's information needs. In the survey, the search facilities of 50 web sites were tested, but none of them received a satisfactory result. Furthermore, as shown in a paper by D. Hawking, E. Voorhees, P. Bailey and N. Craswell entitle "Overview of TREC-8 web track" in *Proc. of TREC*-8, 131-150, Gaithersburg Md., November 1999, little benefit is obtained from the use of link-based methods. The Hawking et al. paper also illustrates the low performance of existing local search technologies.

One problem with using link analysis for local searches is that the link structure of a small web is different from the global Web. As explained in detail below, for the global Web, existing link analysis uses explicit links to a certain site to determine the ranking of the site. While this recommendation assumption is generally correct for the Web, it is commonly invalid for a Web site or intranet. In general, this is because there are relatively few explicit links and the links are created by a small number of authors whose purpose is to organize the contents into a hierarchical structure. Thus, in general the authority of pages is not captured correctly by link analysis.

Since direct application of link analysis in a local searching is impractical, some systems focus on usage information. For example, DirectHit (http://www.directhit.com) harnesses millions of human decisions by millions of daily Internet searchers to provide more relevant and better organized search results. DirectHit's site ranking system, which is based on the concepts of "click popularity" and "stickiness," is currently used by Lycos, Hotbot, MSN, Infospace, About-.com and several other search engines. The underlying assumption is that the more a web-page is visited, the higher it is ranked according to particular queries. These usage-based search engines, however, have restrictions. In particular, one problem is that the technique requires large amounts of user logs and only works for some popular queries. Another problem is that it is easy to fall into a quick positive feedback loop when access to a popular resource leads to its higher rank. This in turn leads to an even higher number accesses to it.

There are also some techniques that operate by combining usage data in link analysis. One such technique is outline in a paper by J. C. Miller, G. Rae and F. Schaefer entitled "Modifications of Kleinberg's HITS algorithm using matrix exponentiation and web log records" in *Proc. of SIGIR'01*, 444-445, New Orleans, September 2001. Miller et al. propose a method to use the usage data to modify the adjacency matrix in Kleinberg's HITS algorithm. Namely, the adjacency matrix M is replaced with a link matrix M, which assign the weight between nodes (pages) based on a user's usage data collected from web-server logs.

One problem, however, with this method is that it does not separate the user logs into sessions based on their tasks. This makes the technique vulnerable to noise data that inevitably will be introduced into the link matrix. Another problem is that Web users often follow different paths to reach a same goal. If only adjacent pages are treated as related, the underlying relationship will not be discovered.

Therefore, there exists a need for an enhanced search engine and method that provides improved local searching of Web sub-spaces (such as Web sites and intranets).

SUMMARY OF THE INVENTION

The invention disclosed herein includes an implicit links search enhancement system and method that generates implicit links obtained from mining user access logs to facilitate enhanced local searching of Web sub-space (such as web sites and intranets). The implicit links search enhancement system and method augments traditional link analysis search engines popular for global Web searches and makes them available for local searching of Web sub-space. The implicit links search enhancement system and method extracts implicit links in addition to explicit links and filters out unimportant links to achieve improved search results. The initial search results obtained with a tradition link analysis search engine then are updated based on the information provided by the implicit links search enhancement system and method.

The implicit links search enhancement method includes generating implicit links from a user access log. The implicit links are implicit recommendation links. All probably implicit links then are extracted from the user access log using a two-item sequential pattern mining technique. This technique includes using a gliding window to find ordered pairs of implicit links or pages. An implicit links graph is constructed using the extracted implicit links. Two-item sequential patterns also are generated from the implicit links and are used to update the implicit links graph. Updated rankings of the search results are made using the updated implicit links graph and a modified implicit links analysis.

In some embodiments the user access log is pre-processed. This pre-processing includes data cleaning, session identification, and consecutive repetition elimination. Data cleaning is performed by filtering out any access entries for embedded objects, such as images and scripts. Browsing sessions are identified by the Internet protocol (IP) address and assumes consecutive accesses from the same IP address during a time interval are from the same user. Consecutive repetition elimination removes IP addresses whose page hits count exceeds some threshold. After pre-processing, the user access log is segmented into individual browsing sessions. Each browsing session is identified by its user identification and pages in a browsing path ordered by timestamp. The ordered pairs are generated from the segmented user access log. First, a gliding window size is defined. Next, the gliding window is applied to each individual browsing session along the browsing path to generate all possible ordered pairs and their probabilities.

In still other embodiments, the ordered pairs are filtered to remove unnecessary links. In particular, a frequency for each of the ordered pairs is determined. In some embodiments, a minimum support threshold is defined and applied to the frequency of each of the ordered pairs. If a frequency is below the minimum support threshold, the associated ordered pair is discarded. Otherwise, the ordered pair is kept and used to update the implicit links graph.

A modified links analysis technique is used to re-rank initial search results. The modified links analysis technique uses the updated implicit links graph, a modified re-ranking formula, and at least one of two re-ranking techniques. The modified re-ranking formula is a re-ranking formula from PageRank but having novel modifications. One of these modifications is that the traditional PageRank only uses 0 or 1 values for each entry in the adjacency matrix, representing the existence of a hyperlink, while the modified re-ranking formula accommodates any floating point values between 0 and 1. The modified links analysis technique uses at least one of two re-ranking techniques: (a) an order-based re-ranking technique; and (b) a score-based re-ranking technique. In some embodiments, the order-based re-ranking technique is preferred. The order-based re-ranking technique uses is based on the rank order of pages. The order-based technique is a linear combination of a position of a page in two lists, where one list is sorted by similarity and the other list is sorted by PageRank values. The score-based technique uses a linear combination of a content-based similarity score and a PageRank value of all web pages.

The implicit links search enhancement system is designed to work in unison with a search engine to provide improved search results. The system includes a user access log pre-processing module, which performs pre-processing of the user access log, and a user access log segmentation module, which segments the pre-processed log into individual browsing sessions. The system also includes an ordered pairs generator and a filter module. The ordered pairs generator generates all possible ordered pairs of implicit links and pages from each of the individual browsing sessions. The filter module filters the extracted ordered pairs to cull any infrequently occurring links and make the search results re-ranking more accurate. The implicit links search enhancement system further includes an updated module, which updates an implicit links graph using the filtered ordered pairs, and a re-ranking module. The re-ranking module uses the updated implicit links graph, a modified re-ranking formula, and at least one re-ranking technique to re-rank search results from a search engine into an improved search result.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

Figure 1:
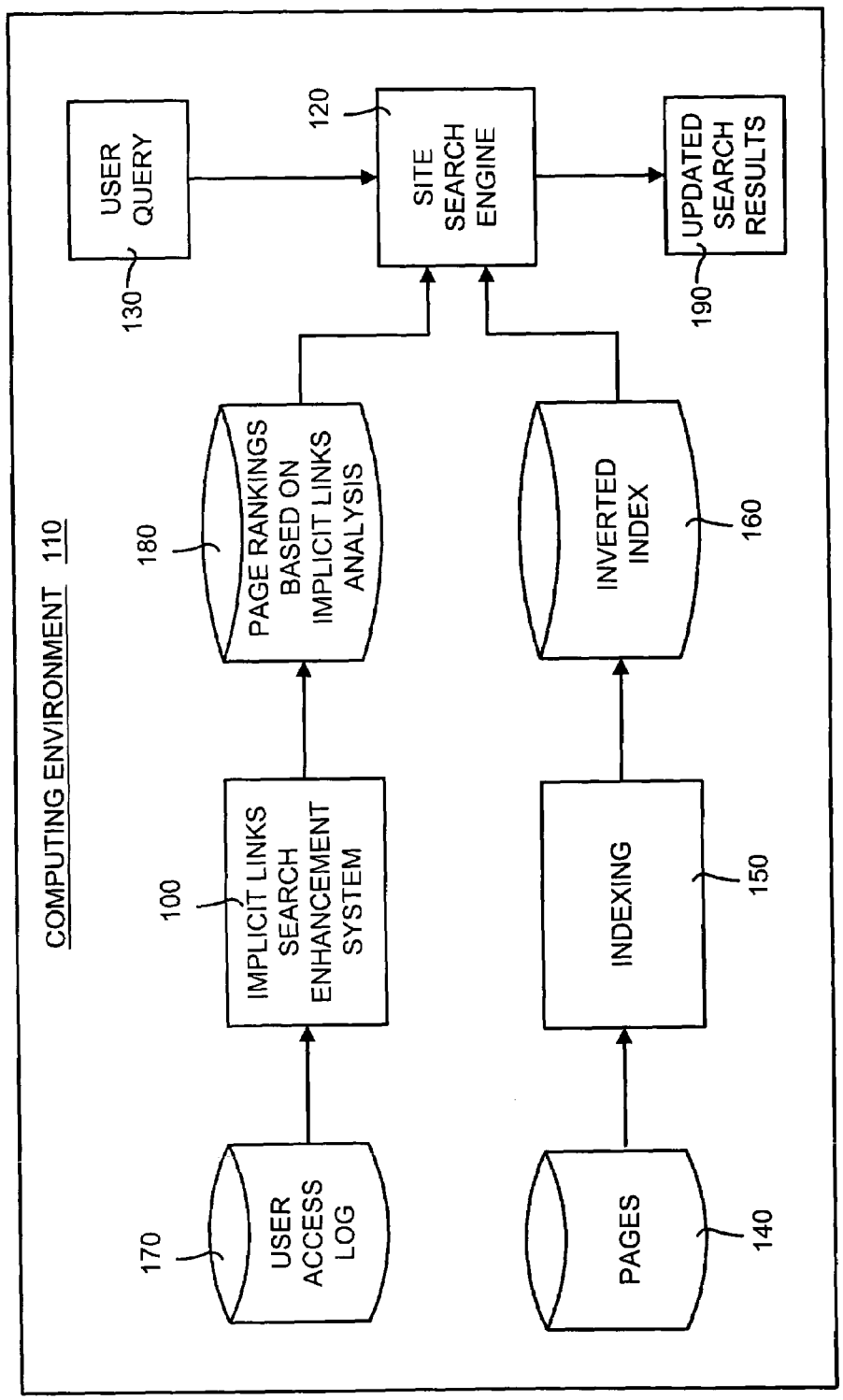
FIG. 1 is a block diagram illustrating a general overview of an exemplary implementation of the implicit links search enhancement system and method disclosed herein.

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Conventional link analysis techniques (such as PageRank and HITS) use eigenvector calculations to identify authoritative pages based on hyperlink structures. The intuition is that a page with high in-degree is highly recommended, and should have a high rank score. However, there is a basic assumption underlying those link analysis algorithms: namely, that the whole Web is a citation graph, and each hyperlink represents a citation or recommendation relationship.

Formally, there is the following recommendation assumption: a hyperlink in page X pointed to page Y stands for the recommendation of page Y by the author of page X. For the global Web, the recommendation assumption is generally correct because hyperlinks encode a considerable amount of authors' judgment. Of course, some hyperlinks are created not for the recommendation purpose, but their influence could be filtered or reduced to an ignorable level.

The recommendation assumption, however, commonly is invalid in the case of a small web. The majority of hyperlinks in a small web are more "regular" than that in the global Web. Most links are from a parent node to children nodes, between sibling nodes, or from leaves to the root (e.g. "Back to Home"). The reason is primarily because hyperlinks in a small web are created by a small number of authors. Moreover, the purpose of the hyperlinks is usually to organize the content into a hierarchical or linear structure. Thus, the in-degree measure does not reflect the authority of pages, making the existing link analysis algorithms not suitable for small web search.

In a small web, hyperlinks could be divided into navigational links and recommendation links. The latter is useful for link analysis to enhance search. However, only filtering out navigational links from all hyperlinks is inadequate because the remaining recommendation links are incomplete. In other words, there are many implicit recommendation links (hereafter called "implicit links" for short) in a small web that could be discovered by mining user access pattern.

II. General Overview

Conventional link analysis techniques (such as PageRank) do not work well when directly applied to analyze the link structure in a small web such as a web site or an intranet. This is because the recommendation assumption for hyperlinks used in these conventional link analysis techniques is commonly invalid in a small web or intranet. The implicit links search enhancement system and method described herein augments conventional search engines to make them more efficient and accurate. Specifically, the implicit links search enhancement system and method includes constructing implicit links by mining users' access patterns and then using a modified link analysis algorithm to re-rank search results obtained from traditional search engines. Experimental results obtained in a working example illustrate that the implicit links search enhancement system and method effectively improves search performance of existing search engines.

FIG. 1 is a block diagram illustrating a general overview of an exemplary implementation of the implicit links search enhancement system and method disclosed herein. The implicit links search enhancement system 100 typically is implemented in a computing environment 110. This computing environment 110, which is described in detail below, includes computing devices (not shown). In general, the implicit links search enhancement system 100 augments the search results obtained by a traditional search engine (such as a site search engine 120) based on an implicit link analysis.

Initially, a user sends a user query 130 to the site search engine 120. In this exemplary implementation, the site may be a web site or an intranet. The site search engine 120 obtains pages 140 (such as web pages) and indexes those pages (box 150). Next, the inverted index 160 is obtained by the site search engine 120. Using existing search techniques, the site search engine 120 obtains and ranks initial search results.

The implicit links search enhancement system 100 obtains data from a user access log 170 and performs an implicit link analysis on the log 170. This analysis is described in detail below. The implicit links search enhancement system 100 outputs page rankings 180 based on the analysis performed by the implicit links search engine 100. The site search engine 120 uses these page rankings to update the initial search results and output updated search results 190 to the user in response to a query.

III. Exemplary Operating Environment

The implicit links search enhancement system and method disclosed herein is designed to operate in a computing environment. The following discussion is intended to provide a brief, general description of a suitable computing environment in which the implicit links search enhancement system and method may be implemented.

Figure 2:
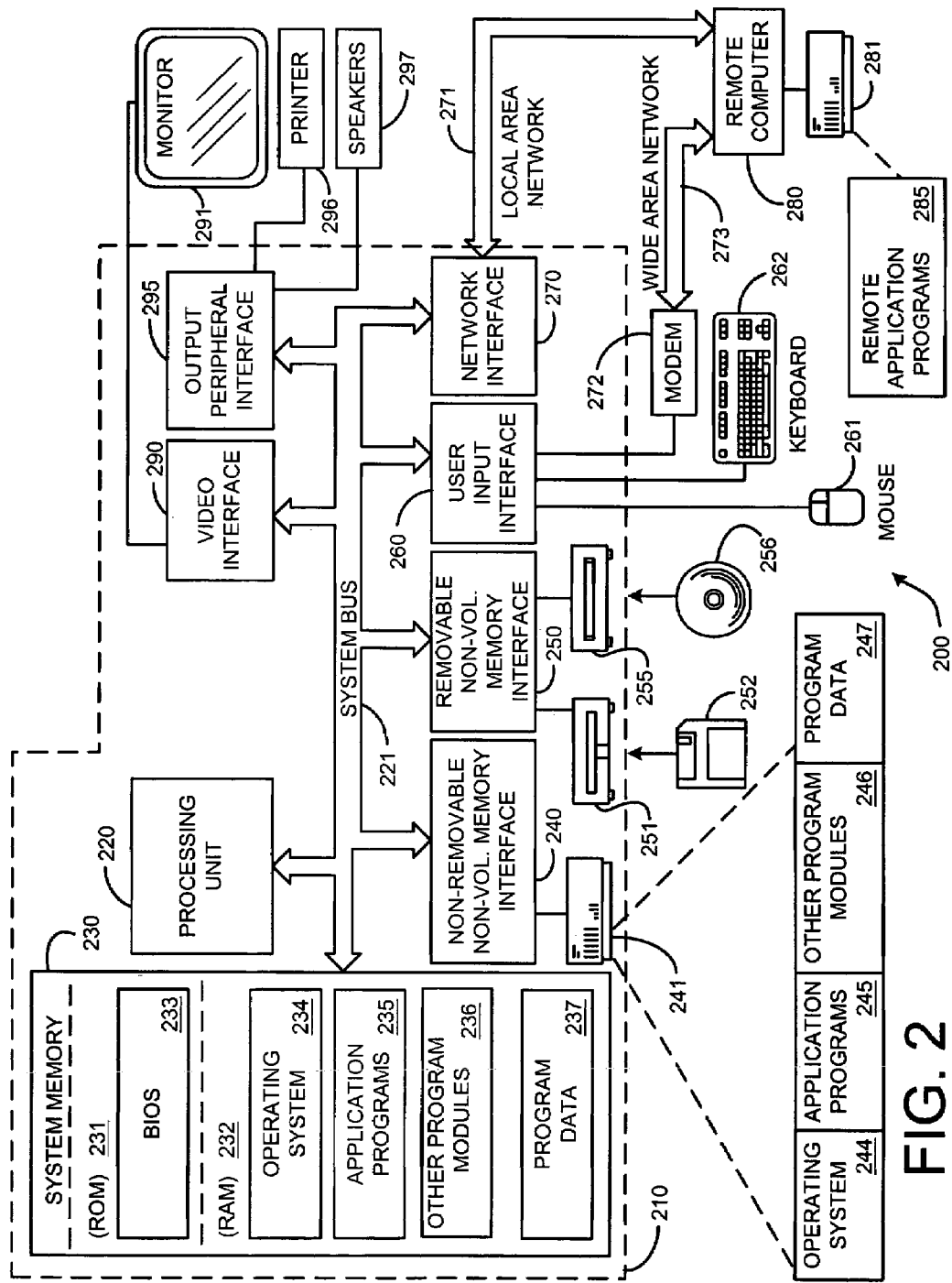
FIG. 2 illustrates an example of a suitable computing system environment in which the implicit links search enhancement system and method shown in FIG. 1 may be implemented.

FIG. 2 illustrates an example of a suitable computing system environment 200 in which the implicit links search enhancement system and method may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The implicit links search enhancement system and method is operational with numerous other general purpose or special purpose computing system environments or configurations. Examples of well known computing systems, environments, and/or configurations that may be suitable for use with the implicit links search engine and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The implicit links search enhancement system and method may be described in the general context of computer-executable instructions, such as program modules, being executed by a computer. Generally, program modules include routines, programs, objects, components, data structures, etc., that perform particular tasks or implement particular abstract data types. The implicit links search enhancement system and method may also be practiced in distributed computing environments where tasks are performed by remote processing devices that are linked through a communications network. In a distributed computing environment, program modules may be located in both local and remote computer storage media including memory storage devices. With reference to FIG. 2, an exemplary system for implementing the implicit links search enhancement system and method includes a general-purpose computing device in the form of a computer 210.

Components of the computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 210 typically includes a variety of computer readable media. Computer readable media can be any available media that can be accessed by the computer 210 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 210. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within the computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 220 through a user input interface 260 that is coupled to the system bus 221, but may be connected by other interface and bus structures, such as, for example, a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

IV. System Components

Figure 3:
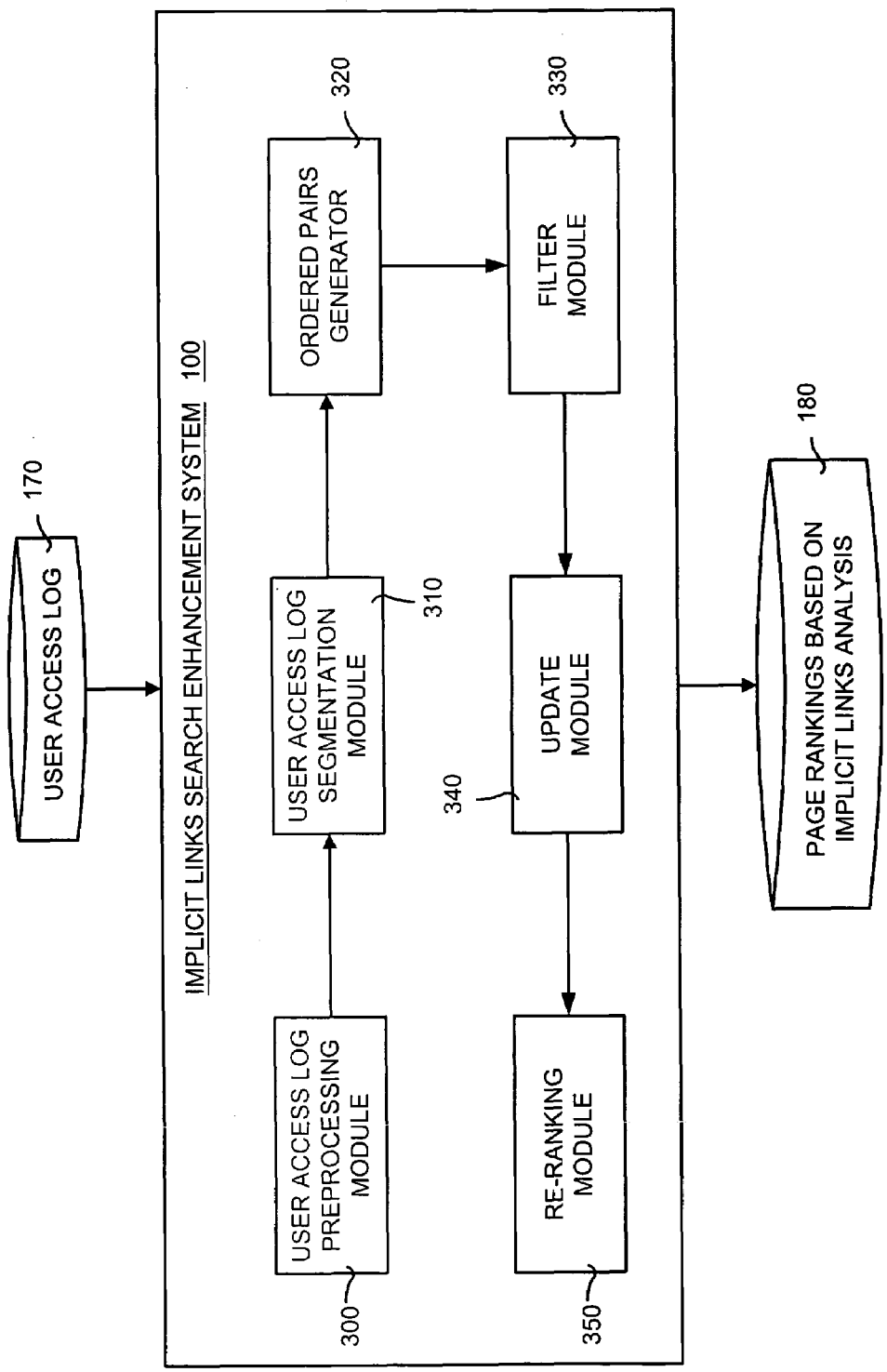
FIG. 3 is a block diagram illustrating the details of an exemplary implementation of the implicit links search enhancement system shown in FIG. 1.

FIG. 3 is a block diagram illustrating the details of an exemplary implementation of the implicit links search enhancement system 100 shown in FIG. 1. As shown in FIG. 3, the implicit links search enhancement system 100 obtains data from the user access log 170 and outputs page rankings based on an implicit links analysis 180. The implicit links search enhancement system 100 includes a number of modules. The function of these modules is described in detail below. The modules located in the implicit links search enhancement system 100 include a user access log preprocessing module 300 and a user access log segmentation module 310. The user access log preprocessing module 300 preprocesses the user access log 170 such that the data is cleaned and users are identified. The preprocessed data is input for the user access log segmentation module 310, which segments the data into individual browsing sessions.

The implicit links search enhancement system 100 also includes an ordered pairs generator 320 and a filter module 330. The ordered pairs generator 320 generates all possible ordered pairs from each of the individual browsing sessions. The ordered pairs processed by the filter module 330 to filter out any infrequently-occurring ordered pairs. The implicit links search enhancement system 100 also includes an update module 340 and a re-ranking module 350. The remaining ordered pairs from the filter module 330 are input to the update module 340 where the pairs are used to update an implicit link graph. The graph is used by the re-ranking module 350 to re-rank the search results (including pages). The output from the implicit links search enhancement system 100 are the updated page rankings 180.

V. Operational Overview

Figure 4:
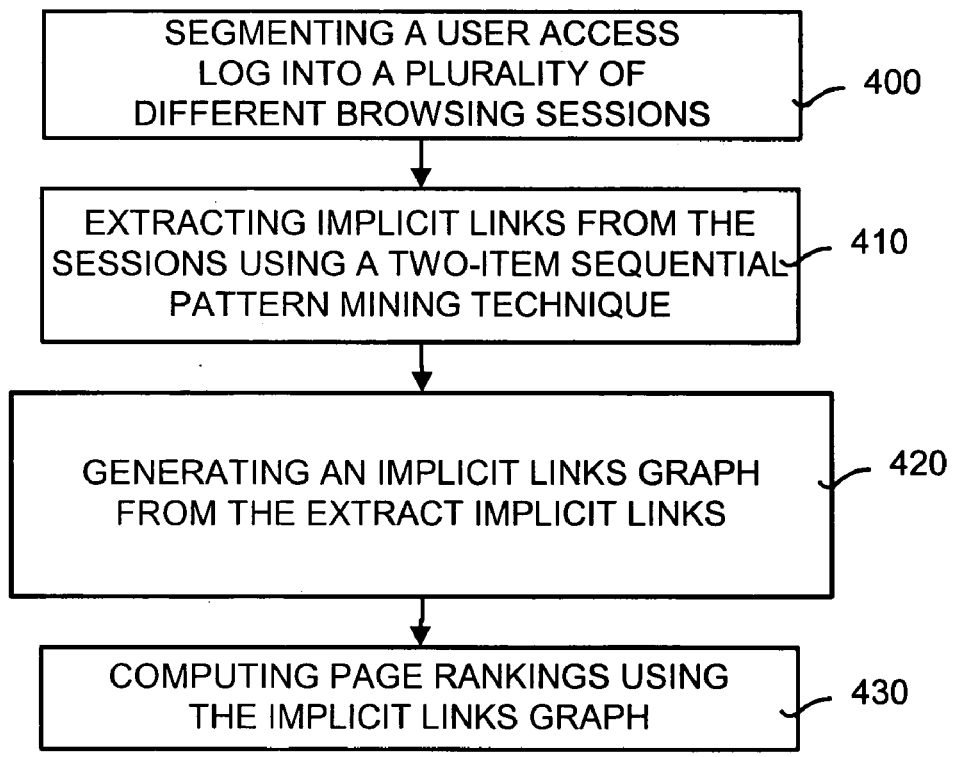
FIG. 4 is a general flow diagram illustrating the general operation of the implicit links search enhancement method of the implicit links search enhancement system shown in FIGS. 1 and 3.

The implicit links search enhancement system 100 disclosed herein uses the implicit links search enhancement method to enable improved search performance of a traditional search engine. FIG. 4 is a general flow diagram illustrating the general operation of the implicit links search enhancement method of the implicit links search enhancement system 100 shown in FIGS. 1 and 3. The method begins by segmenting a user access log into a plurality of different browsing sessions (box 400). Next, implicit links are extracted from the sessions (box 410). In a preferred embodiment, the implicit links are extracted using a two-item sequential pattern mining technique. As explained below, this mining technique uses a gliding window to move over each path in the user access log and generate all ordered pairs.

An implicit links graph is generated using the extracted implicit links (box 420). As discussed below, this implicit links graph is used in place of an explicit link graph used in conventional link analysis techniques. Based on the implicit link graph, a generative model for a user access log can be defined. Given the user access log, this generative model is used to estimate parameters for the log, including the implicit links and their probabilities. Moreover, two-item sequential patterns generated from this mining technique above can be used to update the implicit link graph. Finally, page rankings are computed using the implicit links graph (box 430).

Figure 5:
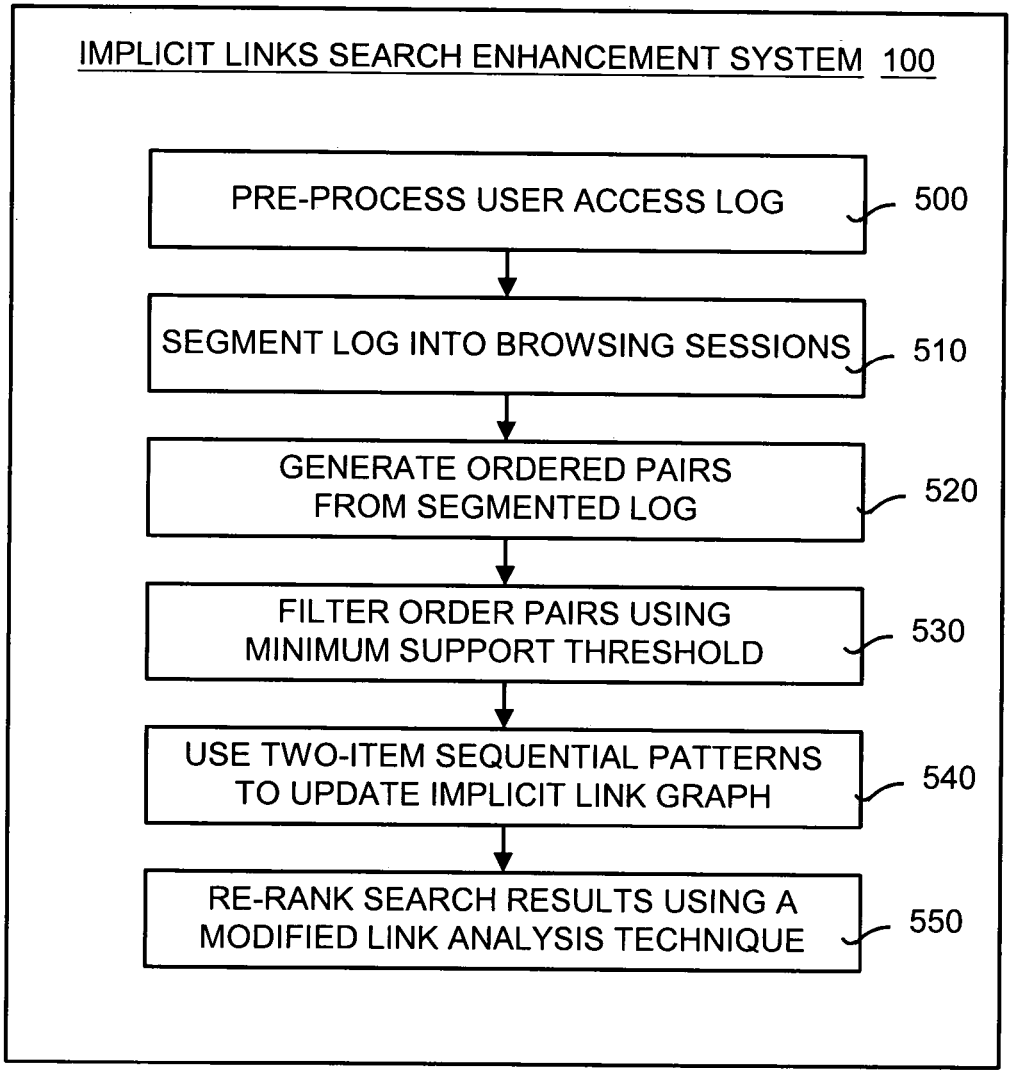
FIG. 5 is a detailed flow diagram illustrating the operation of the implicit links search enhancement method shown in FIG. 4 and used in the implicit link search enhancement system 100 shown in FIGS. 1 and 3.

FIG. 5 is a detailed flow diagram illustrating the operation of the implicit links search enhancement method shown in FIG. 4 and used in the implicit link search enhancement system 100 shown in FIGS. 1 and 3. The implicit links search enhancement method begins by pre-processing a user access log (box 500). This pre-processing includes cleaning, identification and elimination of redundancies of data in the user access log. Next, the log is segmented into individual browsing sessions (box 510). Each browsing session includes a user identification and pages visited in chronological order. Ordered pairs of pages then are generated from the segmented log (box 520).

The ordered pairs of pages then are filtered to remove any pairs that are infrequently occurring (box 530). As explained in detail below, this filtering is performed using a minimum support threshold. This generates two-item sequential patterns, which are used to update an implicit link graph (box 540). Next, using a modified link analysis technique, the search results are re-ranked (box 550). As explained in detail below, the modified link analysis technique includes a modified re-ranking formula and at least one of two types of re-ranking techniques.

VI. Operational Details

Generally a web space can be modeled as a directed graph $G=(V, E)$ where $V=\{w_i | 1 \leq i \leq n\}$ is the set of vertices representing all the pages in the web, and E encompasses the set of links between the pages. $I_{i,j} \in E$ is used to denote that there exists a link between the page $w_i$ and $w_j$. The implicit links search enhancement system and method constructs an implicit link graph instead of the traditional explicit link graph in a small web sub-space. This implicit links graph is a weighted directed graph $G'=(V, E')$, where V is same as above, except that E' encompasses the implicit links between pages. Furthermore, each implicit link $I_{i,j} \in E'$ is associated with a new parameter $P(w_j|w_i)$ denoting the conditional probability of the page $w_j$ to be visited given current page $w_i$.

The implicit links search enhancement system and method disclosed herein extracts implicit links E' by analyzing the observed users' browsing behaviors contained in a user access log. The main idea is to assume that E' controls how the user traverses in the small web. Based on the implicit link graph G' and explicit link graph G, it can be assumed that there exists a generative model for the user access log. The entire user access log consists of a number of browsing sessions $S=\{s_1, s_2, s_3, \ldots\}$. Each session is generated by the following steps:

(1) Randomly select a page $w_i$ from V as the starting point;
(2) Generate an implicit path $(w_i, w_j, w_k, \ldots)$ according to the implicit links E' and the associated probabilities, where it is assumed each selection of implicit link is independent on previous selections;
(3) For each pair of adjacent pages $w_i$ and $w_j$ in the implicit path, randomly select a set of in-between pages $w_{x1}, w_{x2}, \ldots, w_{xm}$ according to the explicit links E to form an explicit path $(w_i, w_{x1}, w_{x2}, \ldots, w_{xm}, w_j)$.

In other words, the model controls the generation of the user access log based on implicit links and explicit links. The final user access log contains abundant information on all implicit links. Thus, implicit links can be extracted by analyzing the observed explicit paths in the user access log.

As discussed above with regard to FIG. 3, the implicit links search enhancement system 100 contains a number of modules. The operational details of these modules now will be discussed.

Figure 6:
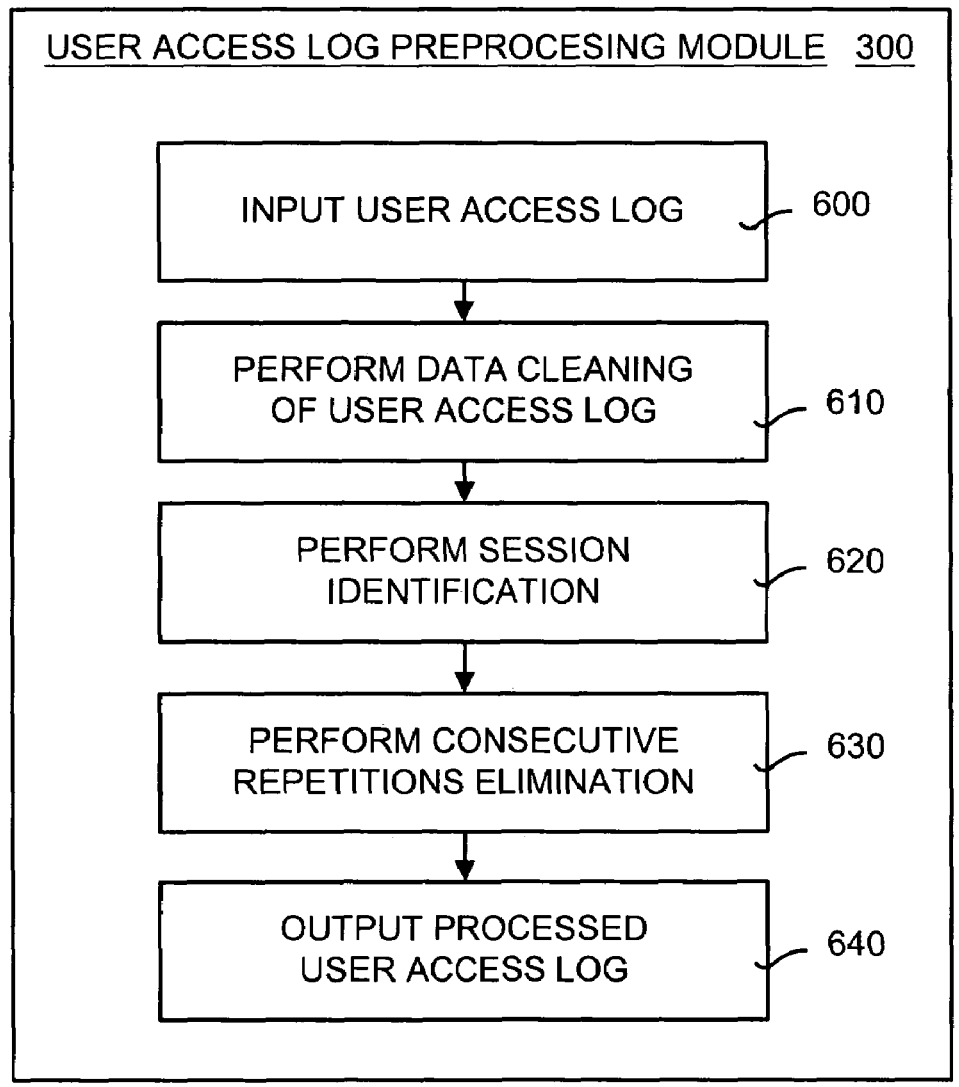
FIG. 6 is a detailed flow diagram illustrating the operation of the user access log pre-processing module shown in FIG. 3.

FIG. 6 is a detailed flow diagram illustrating the operation of the user access log preprocessing module 300 shown in FIG. 3. The user access log preprocessing module 300 initially inputs a user access log (box 600) and then performs data cleaning on the log (box 610). Data cleaning is done by filtering out any access entries for embedded objects, such as images and scripts. Next, session identification is performed (box 620). All users are distinguished by their IP address. This assumes that consecutive accesses from the same IP address during a certain time interval are from a same user.

Next, consecutive repetition elimination is performed (box 630). This elimination handles the case of multiple users that have the same IP address. In particular, IP addresses whose page hits count exceeds some threshold are removed. The consecutive entries are then grouped into a browsing session. Different grouping criteria have been modeled and compared, as set forth in a paper by R. Cooley, B. Mobasher and J. Srivastava entitled "Data preparation for mining World Wide Web browsing patterns" in Knowledge and Information Systems, 1(1):5-32, 1999. Finally, the processed user access log is sent as output (box 640).

Figure 7:
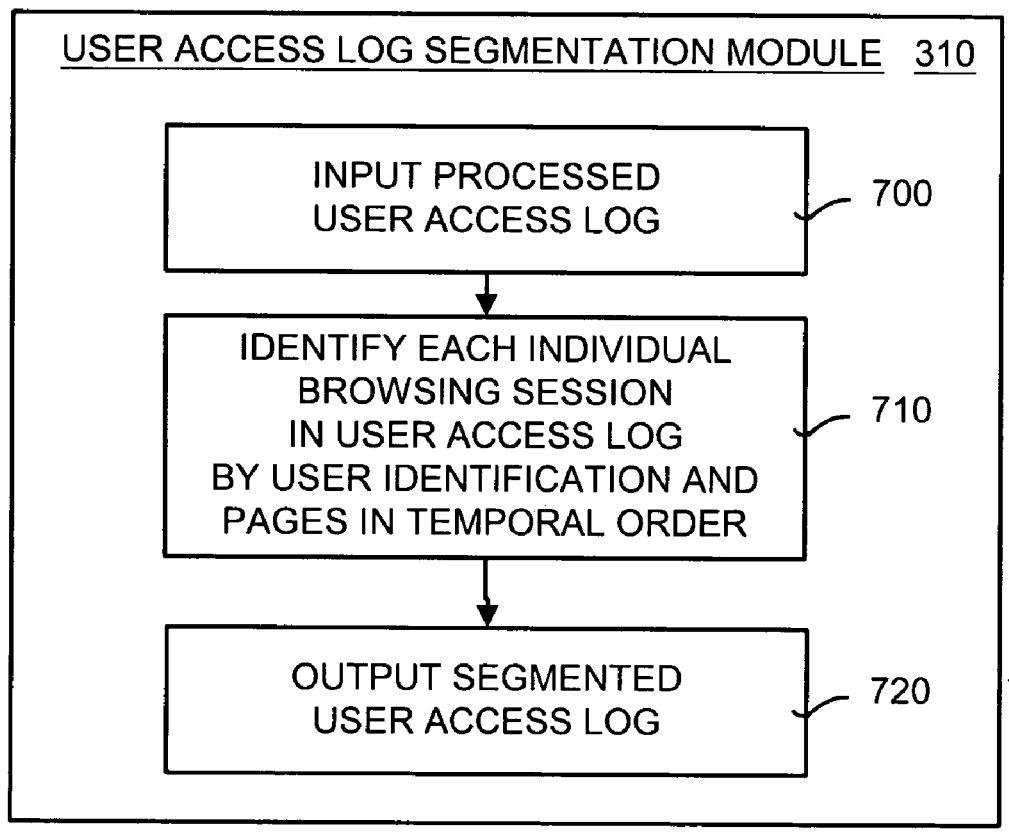
FIG. 7 is a detailed flow diagram illustrating the operation of the user access log segmentation module shown in FIG. 3.

FIG. 7 is a detailed flow diagram illustrating the operation of the user access log segmentation module 310 shown in FIG. 3. The processed user access log is received an input (box 700). Next, each individual browsing session in the processed user access log is identified (box 710). This identification is in terms of the user identification and the pages in a chronological order. Specifically, each browsing session is defined as $S=\{s_1, s_2, \ldots, s_m\}$, where $s_i=(u_i: p_{i1}, p_{i2}, \ldots p_{ik})$. Here, $u_i$ is the user identification and $p_{ij}$ are the pages in a browsing path ordered by timestamp. Next, the segmented user access log is sent as output (box 720).

Figure 8:
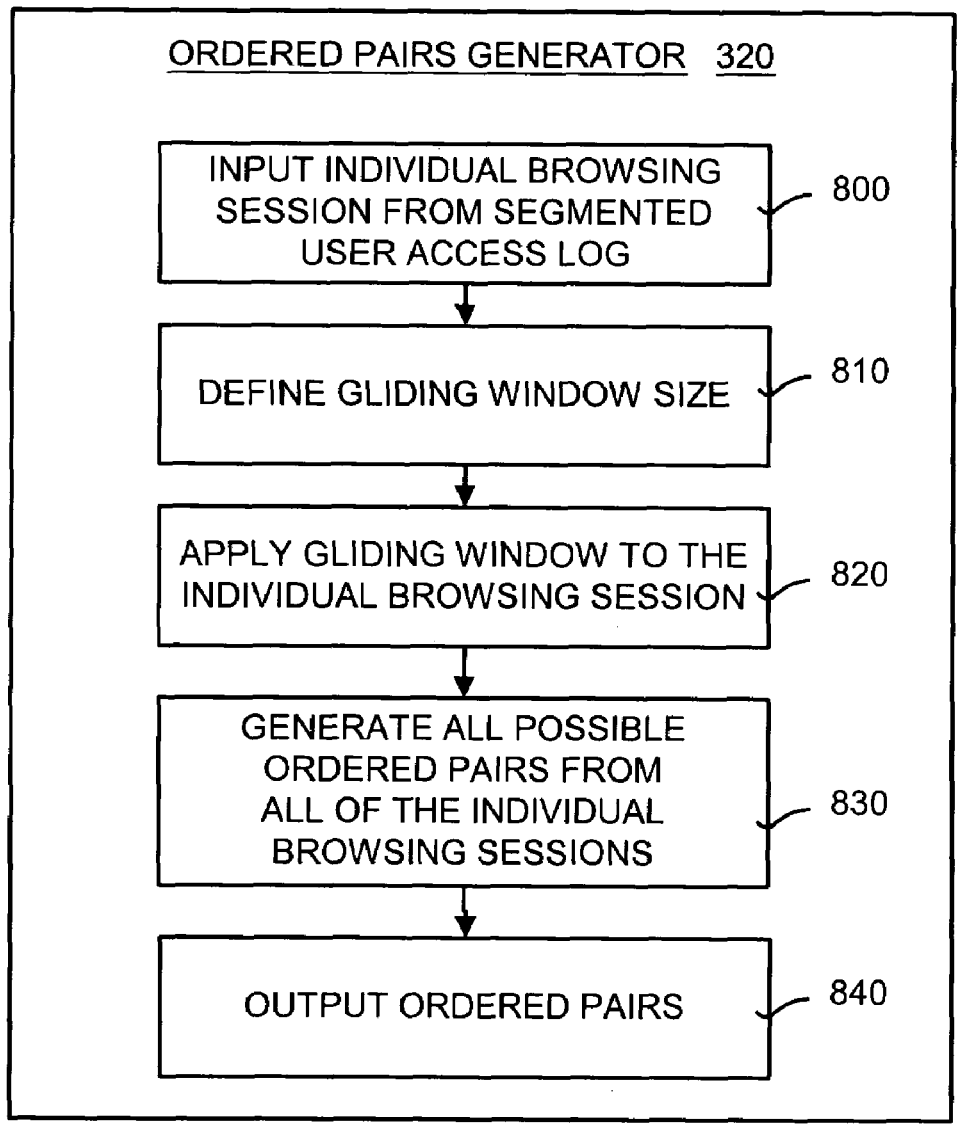
FIG. 8 is a detailed flow diagram illustrating the operation of the ordered pairs generator shown in FIG. 3.

FIG. 8 is a detailed flow diagram illustrating the operation of the ordered pairs generator 320 shown in FIG. 3. The ordered pairs generator 320 uses a two-item sequential pattern mining technique to discover (or generate) possible implicit links. This technique uses a gliding window to move over each explicit path, generating all the ordered pairs and counting the occurrence of each distinct pair. The gliding window size represents the maximum interval a user clicks between the source page and the target page. For example, for an explicit path $(w_{i1}, w_{i2}, w_{i3}, \ldots, w_{ik})$, the technique generates pairs (i1, i2), (i1, i3), ..., (i1, ik), (i2,i3), ..., (i2, ik), .... If one of the pairs (such as (i, j)) corresponds to an implicit link ($I_{i,j} \in E'$), paths of the pattern $(w_i, \ldots, w_j)$ should occur frequently in the log, with different in-between pages.

Referring to FIG. 8, initially, the individual browsing session from the segmented user access log are received as input (box 800). Next, a gliding window size is defined (box 810). The gliding window is used to move over the path within each session to generate ordered pairs of pages. The gliding window size represents the maximum intervals users click between a source page and a target page. The gliding window then is applied to each individual browsing session (box 820). Next all possible ordered pairs are generated from each of the individual browsing sessions (box 830). The order pairs then are sent as output (box 840).

Figure 9:
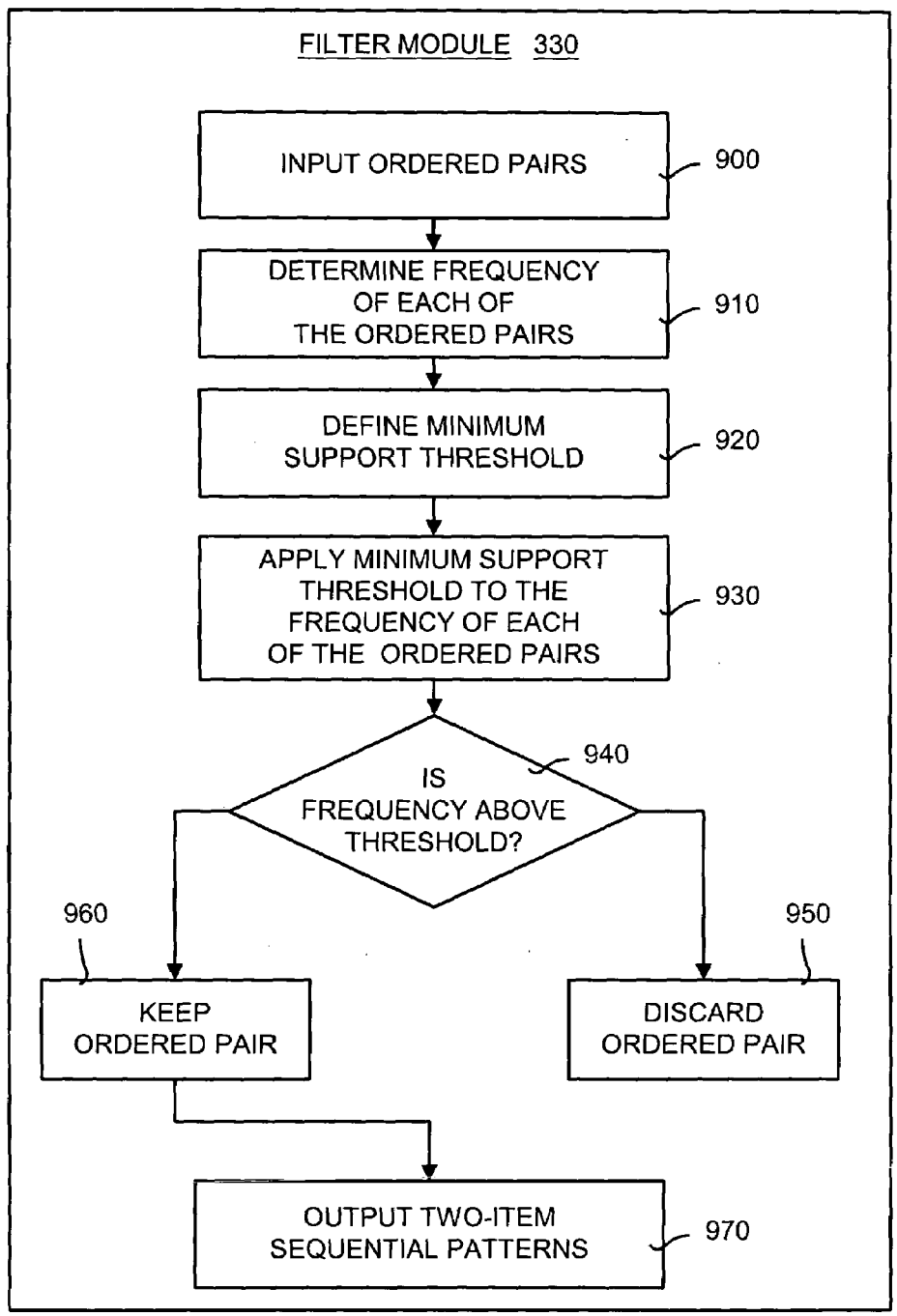
FIG. 9 is a detailed flow diagram illustrating the operation of the filter module shown in FIG. 3.

FIG. 9 is a detailed flow diagram illustrating the operation of the filter module 330 shown in FIG. 3. All possible ordered pairs and their frequency are calculated from all the browsing sessions S, and infrequent occurrences are filtered by a minimum support threshold. Precisely, the support of an item i, denoted as supp(i), refers to the percentage of the sessions that contain the item i. The support of a two-item pair (i, j), denoted supp(i, j), is defined in a similar way. A two-item ordered pair is frequent if its support supp(i, j)≧min-supp, where min_supp is a user specified number.

Referring to FIG. 9, the ordered pairs are receive as input (box 900) and the frequency of each of the ordered pairs is determined (box 910). The minimum support threshold is defined (box 920) and applied to the frequency of each of the order pairs (box 930). A determination then is made whether the frequency is above the threshold (box 940). If not, then the ordered pair is discarded (box 950). Otherwise, the ordered pair is kept (box 960). The filtered two-item sequential patterns then are sent as output (box 970).

After the two-item sequential patterns are generated, they are used to update the implicit link graph G'=(V, E') described previously. All the weights of edges in E' are initialized to zero. For each two-item sequential pattern (i, j), its support supp(i, j) is added to the weight of the edge $I_{i,j}$. All of the weights are normalized to represent the real probability. The resulting graph subsequently is used in a modified link analysis algorithm.

Figure 10:
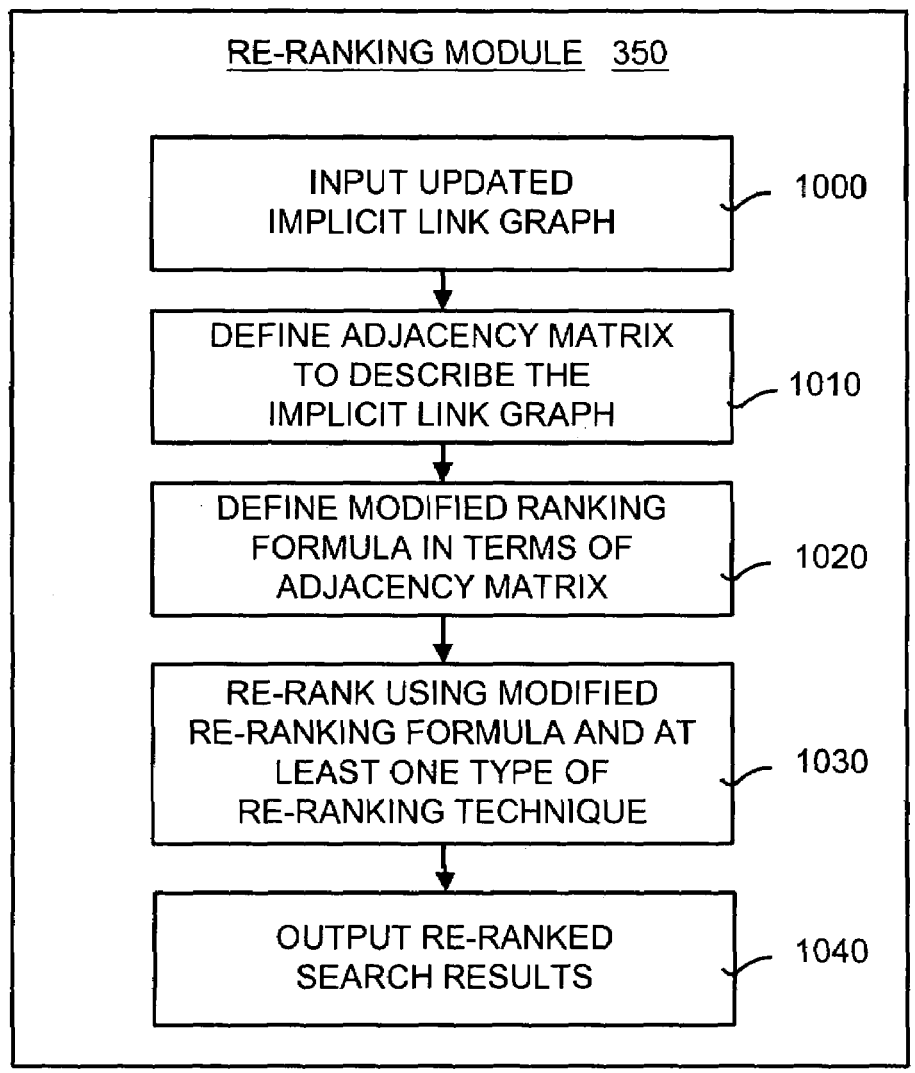
FIG. 10 is a detailed flow diagram illustrating the operation of the re-ranking module shown in FIG. 3.

FIG. 10 is a detailed flow diagram illustrating the operation of the re-ranking module 350 shown in FIG. 3. In general, the re-ranking module 350 inputs the updated implicit link graph or structure (box 1000). Next, an adjacency matrix is defined to describe the implicit link graph (box 1010). A modified re-ranking formula is defined in terms of the adjacency matrix (box 1020). Search results are re-ranked using a modified link analysis technique (box 1030). The modified link analysis technique includes using the modified re-ranking formula and at least one type of re-ranking technique. One type of re-ranking technique is a score based re-ranking technique. Another type of re-ranking technique is an order based re-ranking technique. In a preferred embodiment, the order-based re-ranking technique is used. The re-ranked search results then are sent as output (box 1040).

More specifically, after inputting the implicit link graph or structure, a modified link analysis technique is used to re-rank the search results obtained from a traditional search engine. In a preferred embodiment, the modified link analysis technique is based on the PageRank link analysis algorithm that is modified with novel modifications. As mentioned above, the traditional PageRank algorithm is described in a paper by L. Page et al. entitled "The PageRank citation ranking: bringing order to the Web".

The modified PageRank links analysis technique works as follows. First, an adjacency matrix is constructed to describe the implicit links graph. In particular, assume the graph contains n pages. The n×n adjacency matrix is denoted by A and the entries A[i, j] is defined to be the weight of the implicit links $I_{i,j}$. The adjacency matrix is used to compute the rank score of each page. In an "ideal" form, the rank score $PR_i$ of page $w_i$ is evaluated by a function on the rank scores of all the pages that point to page $w_i$:

$$PR_i = \sum_{j:I_{j,i} \in E} PR_j \cdot A[j, i]$$

This recursive definition gives each page a fraction of the rank of each page pointing to it—inversely weighted by the strength of the links of that page. The above equation can be written in the form of matrix as:

$$\vec{PR} = A\vec{PR}$$

In practice, however, many pages have no in-links (or the weight of them is 0), and the eigenvector of the above equation is mostly zero. Therefore, the basic model is modified to obtain an "actual model" using a random walk technique. In particular, upon browsing a web-page, having a probability 1−ϵ, a user randomly chooses one of the links on the current page and jumps to a linked page, having a probability parameter ϵ. The user "resets" by jumping to a web-page picked uniformly and at random from the collection. Therefore, the random walk technique is used to modify the ranking formula to the following form:

$$PR_i = \frac{\varepsilon}{n} + (1 - \varepsilon) \sum_{j:I_{j,i} \in E} PR_j \cdot A[j, i]$$

Or, written in matrix form:

$$\vec{PR} = \frac{\varepsilon}{n}\vec{e} + (1 - \varepsilon)A\vec{PR}$$

where $\vec{e}$ is the vector of all 1's, and ϵ(0<ϵ<1) is the probability parameter. In a preferred embodiment, the probability parameter ϵ is set to 0.15. Instead of computing an eigenvector, a Jacobi iteration iterative method is used to resolve the equation.

The modified links analysis technique also uses at least one type of re-ranking technique: (1) a score based re-ranking technique; and (2) an order based re-ranking technique. The score based re-ranking technique uses a linear combination of content-based similarity score and the PageRank value of all web-pages:

Score(w)=αSim+(1−α)PR(αϵ[0, 1])

where Sim is the content-based similarity between web-pages and query words, and PR is the PageRank value.

The order based re-ranking technique is based on the rank orders of the web-pages. Order based re-ranking is a linear combination of a position of a pages in two lists. One list is sorted by similarity scores and the other list is sorted by PageRank values. That is, Score(w)=α$O_{Sim}$+(1−α)$O_{PR}$(αϵ[0, 1])

where $O_{Sim}$ and $O_{PR}$ are positions of page w in similarity score list and PageRank list, respectively.

VII. Working Example

In order to more fully understand the implicit links search enhancement system and method disclosed herein, the operational details of an exemplary working example are presented. It should be noted that this working example is only one way in which the implicit links search enhancement system and method may be implemented. In this working example, the experimental data set, the evaluation metrics, and the result of a study based on those metrics are discussed.

Implicit Links Generation

The implicit links search enhancement system and method disclosed herein improves local searches (such as performed on a web site or intranet) by analyzing a user's access pattern by mining a user access log. In this working example, the web site a having 4-month click-thru logs was used. Before mining for the user access patterns on this log, the log was preprocessed by performing data cleaning, session identification and consecutive repetition elimination. Data cleaning was performed by filtering out the access entries for embedded objects such as images and scripts. Afterward, users were distinguished by their IP address. In other words, it was assumed that consecutive accesses from the same IP during a certain time interval were from a same user.

In order to handle the case of multiple users with the same IP address, IP addresses whose page hits count exceeds some threshold were removed. The consecutive entries then were grouped into a browsing session. Different grouping criteria were modeled and compared. This is detailed in a paper referenced above by Cooley et al. entitled "Data preparation for mining World Wide Web browsing patterns". In this working example, the "overtime" criterion was selected. More specifically, a new session starts when the duration of the whole group of traversals exceeds a time threshold. Consecutive repetitions within a session then are eliminated. For example, session (A, A, B, C, C, C) is compacted to (A, B, C). After preprocessing, the log contained about 300,000 transactions, 170,000 pages and 60,000 users.

The original web-pages and link structure was downloaded from the web site. About 170,000 pages were downloaded and indexed using the Okapi system. This system is detailed in a paper by S. E. Robertson, S. Walker, M. M. Beaulieu, M. Gafford and A. Payne entitled "Okapi at TREC-4" in *Proc. of TREC*-4, 73-96, NIST Special Publication 500-236, October 1996. For each page, an HTML parser is applied to removing tags and extracting links in pages. Finally, 216,748 hyperlinks were obtained in total.

Several parameters were fixed and used in this working example. Namely, the window size was set at 4, the minimum support threshold was set at 7, a support-weighted adjacent matrix was used, and an order-based re-ranking technique was used for search.

These parameters are determined based on an extensive experiment that is discussed below. The implicit links search enhancement system and method was compared with several state-of-the-art algorithms including full text search, explicit link-based PageRank, DirectHit, and modified-HITS algorithm. After two-item sequential pattern mining, 336,812 implicit links are generated. There are 22,122 links that are both in the explicit links and the generated implicit links. In other words, 11% of the links are overlapped. this is a relatively small number of overlapping links.

Some evidences should be given to prove that the implicit links satisfy the recommendation assumption. In order to achieve this, a prediction model was developed by using implicit links. This model is similar to the technique used in a paper by Q. Yang, H. H. Zhang and T. Li entitled "Mining web logs for prediction models in WWW caching and prefetching" in *Proc. of KDD'*01, 473-478, August 2001. This model predicts whether a page will be visited by a user in the next step. The prediction accuracy directly reflects the correctness of the page recommendation. Four-fifths of the log data was taken as the training data to create implicit links and one-fifth of the data as testing data. The following precision is used as the evaluation metrics:

$$\text{Prediction precision} = \frac{P^+}{(P^+ + P^-)}$$

where P+ and P− are the numbers of correct and incorrect predictions, respectively.

Figure 11:
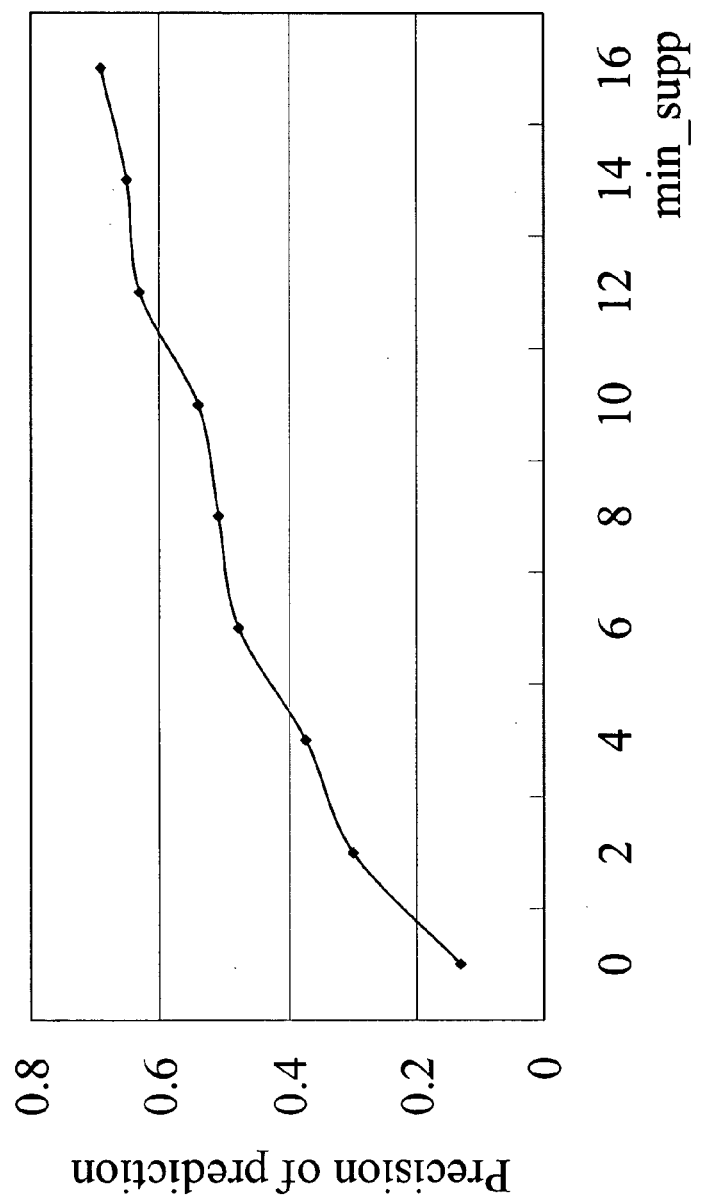
FIG. 11 illustrates the precision of page prediction by implicit links in a working example.

As stated previously, the implicit links are generated by the restriction of the minimum support. The higher the support of the implicit link, the higher the probability of the linked pages accessed at the same session. FIG. 11 illustrates the precision of page prediction by implicit links in the working example. As shown in FIG. 11, the prediction precision monotonously increases as the minimum support increases. This indicates that the implicit links of the implicit links web search engine and method are accurate and reflects user's behaviors and interests.

The quality of implicit links is evaluated from human perspective. Three subsets were randomly selected that contain 375 implicit links in total. Seven volunteer graduate students who are familiar with the subjects of the pages were chosen as evaluation subjects. They are asked to evaluate whether the implicit links are recommendation links according to the content of the pages. As shown in the upper part of Table 1, about 67% of implicit links in average are recommendation links. Another three subsets selected from explicit links are shown in the lower part of Table 1. Here, the average recommendation link ratio is about 39%.

TABLE 1

Recommendation links in implicit and explicit links.

| Subset | Recomm. link | Ratio |
|---|---|---|
| Implicit link | | |
| 1 | 128 | 87 | 0.68 |
| 2 | 114 | 82 | 0.72 |
| 3 | 133 | 84 | 0.63 |
| Average | | 0.67 |
| Explicit link | | |
| 1 | 107 | 47 | 0.44 |
| 2 | 84 | 26 | 0.31 |
| 3 | 99 | 42 | 0.42 |
| Average | | 0.39 |

Several examples of these implicit links are shown in Table 2. For example, the fourth implicit link "Xuanlong's course: CS188"→"Wilensky's course: CS188" represents the same course taught by different instructors. When the user visited the page "Xuanlong's course: CS188", page "Wilensky's course: CS188" could be recommended. Table 2 also shows that parts of the implicit links are overlapped with the explicit links, which are created by the author and satisfy the recommendation assumption.

TABLE 2

Examples of the implicit links.

| # | Source Page | Target Page | Explanation | Exp. Link? |
|---|---|---|---|---|
| 1. | Book: Artificial Intelligence: A Modern Approach | The book's slide | A book and its slides | Y |
| 2. | Jordan's Homepage | Andrew Ng's Homepage | Teacher and student | Y |
| 3. | Various pictures | Landscape photographs | Picture | N |
| 4. | Xuanlong's course: CS188 | Wilensky's course: CS188 | Same course | N |
| 5. | Anthony Joseph's Homepage | Brian Harvey's HomePage | People in Vision group | N |
| 6. | AI on the Web | Machine learning software | Machine learning | N |
| 7. | Sequin's course: CS284 | Sequin's course: CS285 | Course of same person | N |

Search Result

Because the implicit links search enhancement system and method only re-ranks the results of the full text search engines, the global search precision is not changed. However, the precision of top matches is improved. Given a query Q, let R be the set of the relevant pages to the query and |R| be the number of pages. Assume the implicit links web search enhancement system and method generates a result set. Only the top 30 are taken from the result set as A. The precision of search is defined as:

$$Precision = \frac{|R \cap A|}{|A|}$$

In order to evaluate the implicit links web search engine and method effectively, a new evaluation methodology is proposed, namely, the degree of authority. Given a query, the seven volunteers were asked to identify the top 10 authoritative pages according to a human perspective ranking of all the results. The set of 10 authoritative web-pages is denoted by M and the set of top 10 results returned by search engines is denoted by N.

$$Authority = \frac{|M \cap N|}{|M|}$$

The precision measures the degree to which the algorithm produces an accurate result; while the authority measures the ability of the algorithm to produce the pages that are most likely to be visited by the user or the authority measurement is more relevant to user's satisfactory degree on the performance of a local (or small web) search engine.

Figure 12:
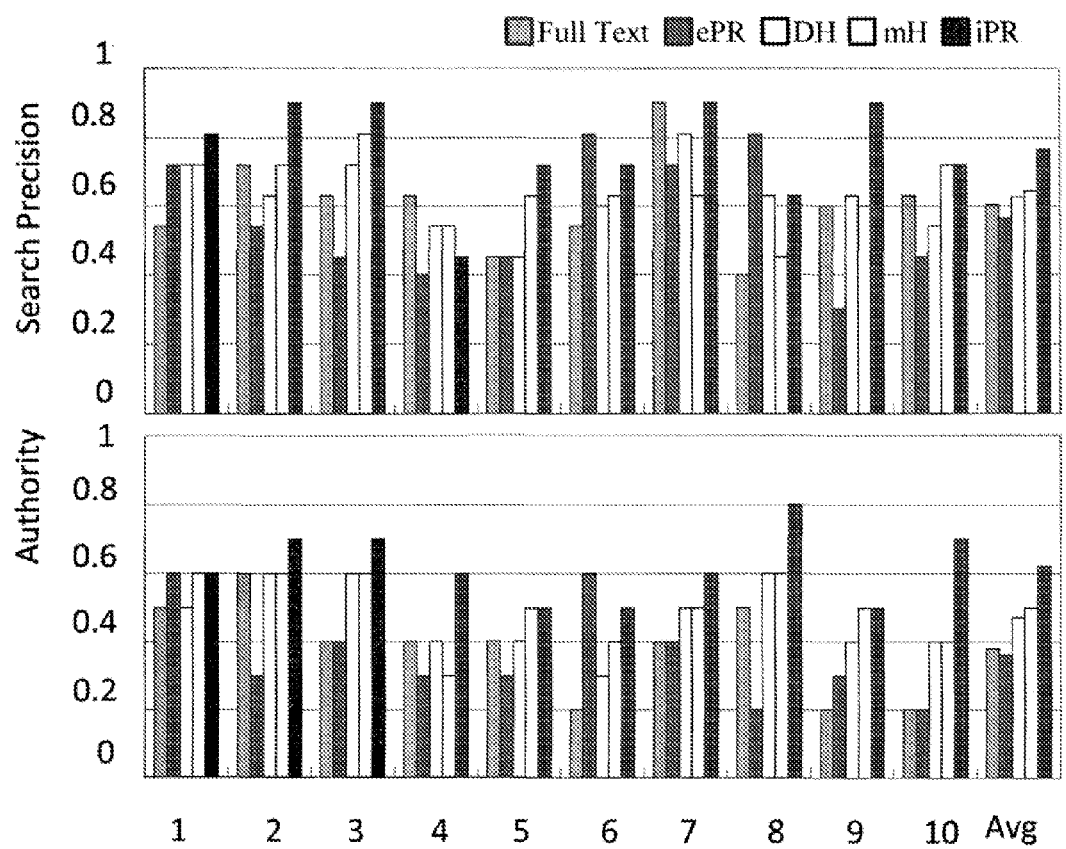
FIG. 12 is a bar graph illustrating the precision and authority of different ranking methods.

The volunteers were asked to evaluate both precision and authority of search results for the selected 10 queries (which are Jordan, Vision, Artificial Intelligence, Bayesian Network, wireless Network, Security, Reinforcement, HCI, Data Mining, and CS188). The final relevance judgment for each document is decided by majority votes. FIG. 12 is a bar graph illustrating the precision and authority of the different ranking methods. As shown in FIG. 12, the comparison of the implicit links search enhancement system and method with full text search, PageRank, DirectHit and modified-HITS algorithms. Here iPR denotes the implicit links search enhancement system and method (or implicit link-based PageRank), while ePR, mH and DH correspond to explicit link-based PageRank, modified-HITS, and DirectHit, respectively. The right-most label "Avg" stands for the average value for the 10 queries. As can be seen from FIG. 12, the implicit links web search engine and method outperforms the other 4 algorithms. The average improvement of precision over the full text is 16%, PageRank 20%, DirectHit 14% and modified-HITS 12%. Moreover, the average improvement of authority over the full text is 24%, PageRank 26%, DirectHit 15% and modified-HITS 14%. From FIG. 12, it can also been seen that the performance of explicit link-based PageRank is even worse than that of the full text search technique, demonstrating the unreliability of explicit link structure of this website.

In FIG. 12, DirectHit has a medium performance in all the algorithms. DirectHit outperforms full text search because it takes usage information into account. However, DirectHit could not reveal the real authoritativeness of web-pages. The experiment also shows that DirectHit only improves a part of popular queries' precision. Thus, the average precision is not as good as the implicit links search enhancement system and method. The modified-HITS algorithm achieves higher performance than full text search, DirectHit and explicit link-based PageRank. In fact, this algorithm is a special case of the implicit links search enhancement system and method when the minimum support threshold is set to 0 and window size is set to 1. However, as mentioned above, when the minimum support threshold is set to 0, a great deal of noise data will be created. When the window size is set to 1, many useful links will be missed and this also affects performance.

Table 3 shows the top 10 pages for the query "vision." It was also found that the results from implicit link-based PageRank are more authoritative than that from the modified-HITS. By way of example, "ANSI Common Lisp" is a page ranked high by explicit link-based PageRank because contains numerous out-links and in-links. But according the user logs, this page is rarely accessed.

TABLE 3

Ranks of query "vision" in different method.

| Web-page Descriptions | iPR | ePR | mH | DH |
|---|---|---|---|---|
| UC Berkeley Computer Vision Group | 1 | 41 | 2 | 8 |
| David Forsyth's Book: Computer Vision | 2 | 94 | 1 | 4 |
| David Forsyth's Book: Computer Vision(3rd Draft) | 3 | 9 | 3 | 10 |
| A workshop on Vision and Graphics | 4 | 44 | 20 | 1 |
| UC Berkeley Computer Vision Group | 5 | 2 | 13 | 7 |
| CS 280 Home Page | 6 | 14 | 10 | 11 |
| Thomas Leung's Publications | 7 | 55 | 4 | 31 |
| Jitendra Malik's Brief Biography | 8 | 17 | 7 | 6 |
| An overview of Grouping and Perceptual Organization | 9 | 5 | 21 | 5 |
| David Forsyth's Homepage | 10 | 87 | 29 | 35 |
| A paper of Phil | 13 | 1 | 6 | 9 |
| Kim' ZuWhan resume | 18 | 3 | 5 | 2 |
| A slide of Landay's talk about Notepals | 37 | 4 | 33 | 14 |
| John A. Haddon's publication | 39 | 23 | 41 | 13 |
| A slide of Landay's talk about Notepals | 41 | 6 | 42 | 18 |
| Chris Bregler's Publications | 44 | 27 | 8 | 42 |
| Course: Appearance Models for Computer Graphics and Vision | 51 | 63 | 47 | 3 |
| Reference of Object Recognition | 62 | 59 | 9 | 17 |

Figure 13:
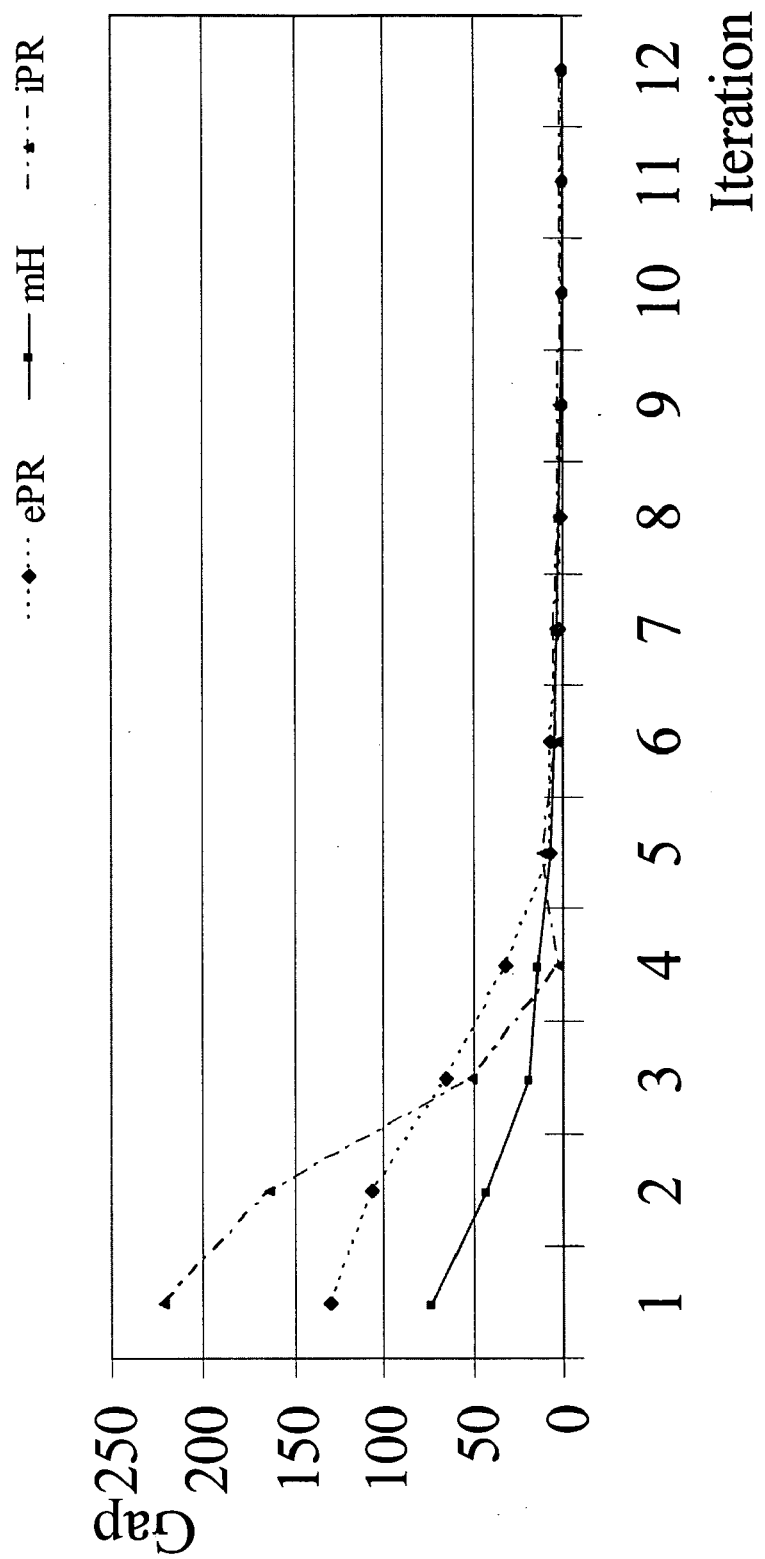
FIG. 13 illustrates the convergence curves of different ranking models.

FIG. 13 illustrates the convergence curves of different ranking models. As shown in FIG. 13, the gap represents the difference of the sum of page scores from previous iterations. In FIG. 13, the difference of PageRank values between consecutive iterations drops significantly after 7 iterations and shows a strong tendency toward zero. This illustrates the convergence of the implicit links web search engine and method in a practical way.

Parameter Selection

As discussed above, several parameters are used in this working example. These parameters include window size=4, minimum support threshold=7, using support-weighted adjacent matrix, and using order-based re-ranking. Following are the reasons for selecting these exemplary values of these parameters.

Figure 14A:
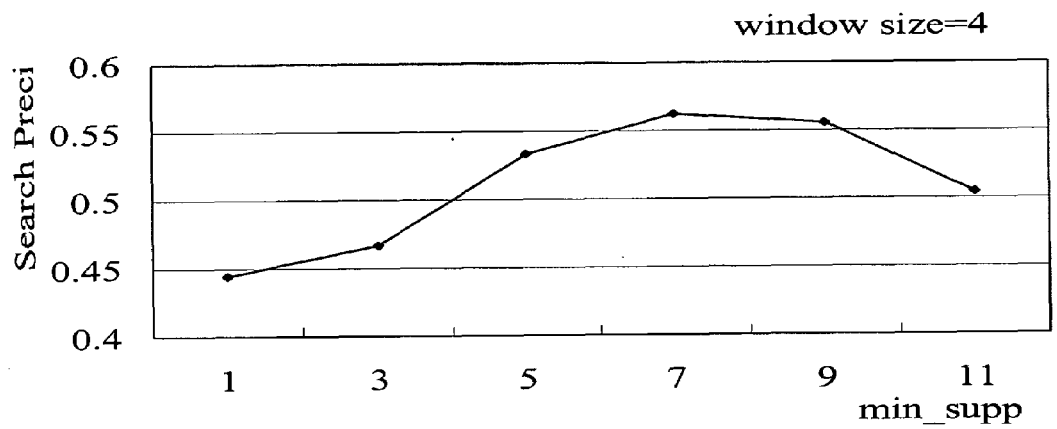
FIGS. 14A and 14B illustrate the search precision and implicit link number with different minimum support thresholds.
Figure 14B:
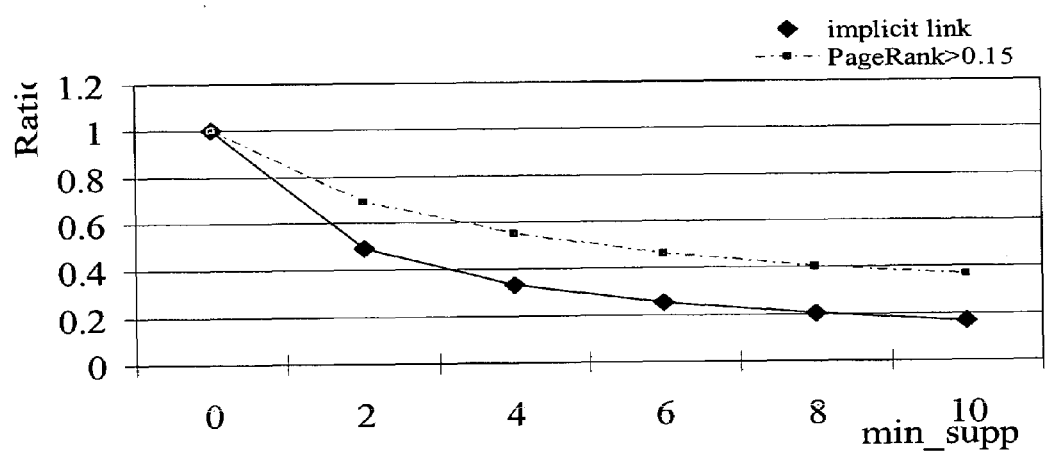

In order to choose the most suitable support threshold for mining user access pattern, the seven volunteers were asked to test on 5 queries for each support. The 5 queries are Machine Learning, Web Mining, Graphics, OOP, and Database Concurrency Control. Next, average precision of the top 30 documents was computed. FIGS. 14A and 14B illustrate the search precision and implicit link number with different minimum support thresholds. As shown in FIG. 14A, the implicit links search enhancement system and method achieved the best search precision when the minimum support is 7. FIG. 14A also illustrates that the system performance dramatically drops when the minimum support threshold is less than 4 or higher than 10. From these observations, the reason can be explained as follows. First, when the minimum support threshold is too small, user's random behaviors are counted and the number of the implicit links is large. This is illustrated in FIG. 14B, where the ratio denotes the proportion of link number of current minimum support threshold (min_supp) to the total link number. This means that more irrelevant links are introduced to affect the ranking results. Second, a high minimum support threshold results in the missing of some potentially important but infrequent implicit links. As shown in FIG. 14B, by increasing the support value, the number of implicit links decreases. This leads to the decrease of the number of pages whose PageRank is larger than 0.15 (e=0.15). When the minimum threshold support (min_supp) is large, the impact of the PageRank on the search result is very weak.

Figure 15:
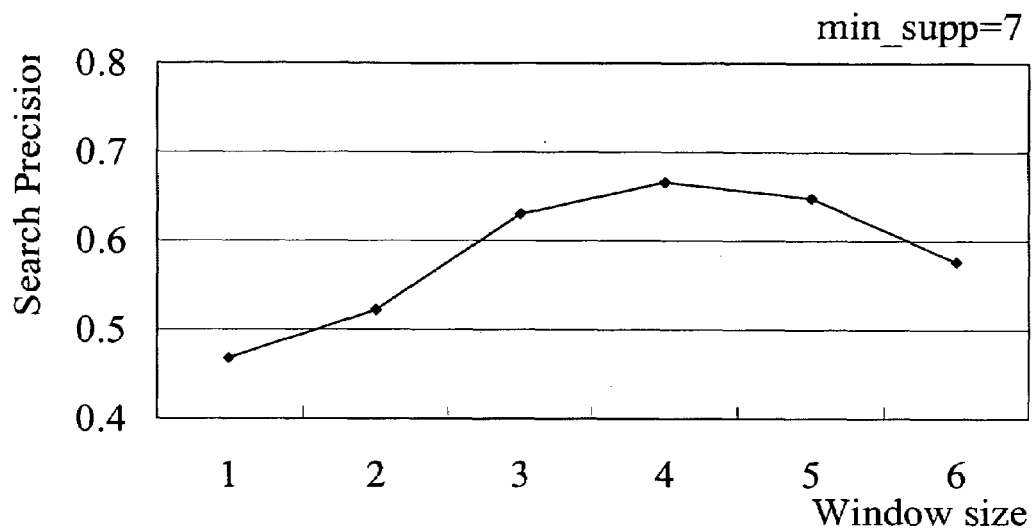
FIG. 15 illustrates the impact of different window sizes on search precision.
Figure 16:
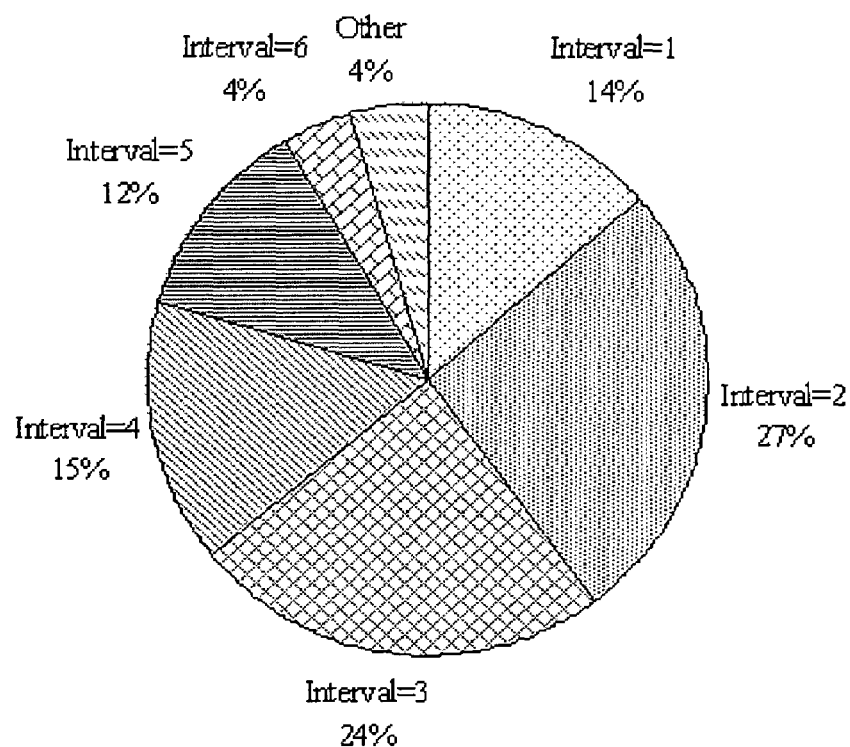
FIG. 16 illustrates an interval distribution of implicit links.

Next, the impact of the window size was tested. FIG. 15 illustrates the impact of different window sizes on search precision. The evaluation method is same as above. From FIG. 15, it was found that the precision increases when the window size changes from 1 to 4. This proves the analysis set forth in a paper by P. Berkhin, J. D. Becher, and D. J. Randall entitled "Interactive path analysis of web site traffic" in *Proc. of the 7$^{th}$ SIGKDD,* 414-410, San Francisco, Calif., 2001, that a user may click several times to get what is desired. On the other hand, by analyzing the effect of window size on the number of implicit links, it was found that more noisy implicit links are created if the window size is large. Thus, if the window size continues to increase, then the performance may decrease. Furthermore, interval distribution was calculated for the mined implicit links. FIG. 16 illustrates an interval distribution of implicit links. As shown in FIG. 16, about 13.7% of the implicit link is accessed in one step, 26% in two steps, 24% in three steps, and so on.

Figure 17:
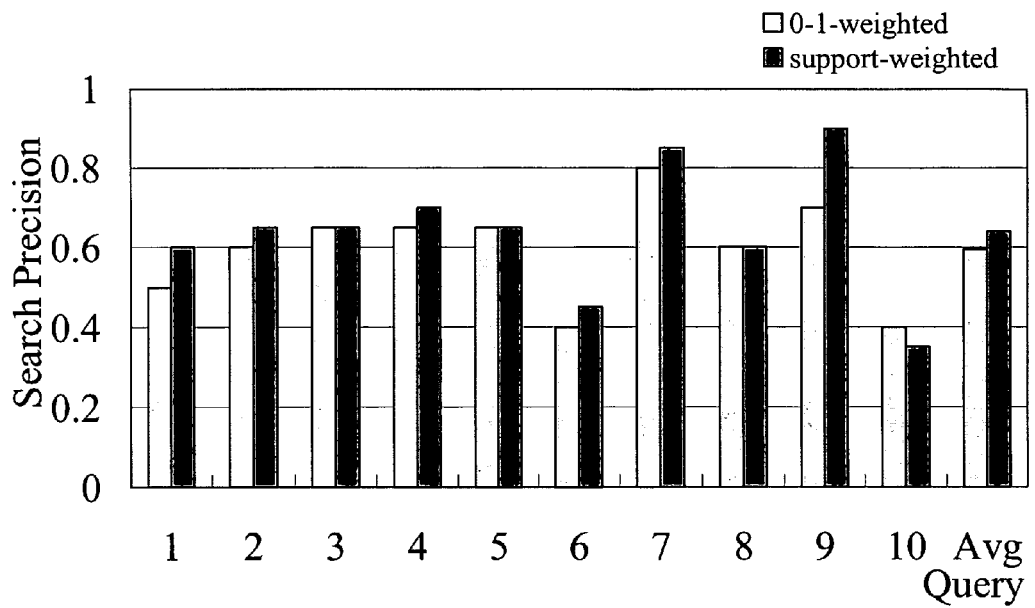
FIG. 17 illustrates the precision of different weighting methods.

When constructing the adjacent matrix, there are two choices to set up the weight of the matrix: the weight with 0 or 1 (called 0-1 weighted) or the weight with the support of the implicit link (called support-weighted). The 7 volunteers were asked to test on 10 queries (which are Machine Learning, Web Mining, Graphics, OOP, Database Concurrency Control, Classification, Titanium, Distributed Database System, Parallel Algorithm, and Mobile), the average precision is evaluated for the top 30 documents. FIG. 17 illustrates the precision of different weighting methods. As can be seen from FIG. 17, the support-weighted method achieves better search precision compared to 0-1 weighted method in average. The improvement may be due to the fact that the support-weighted method has stronger recommendation than the 0-1 weighted.

Figure 18:
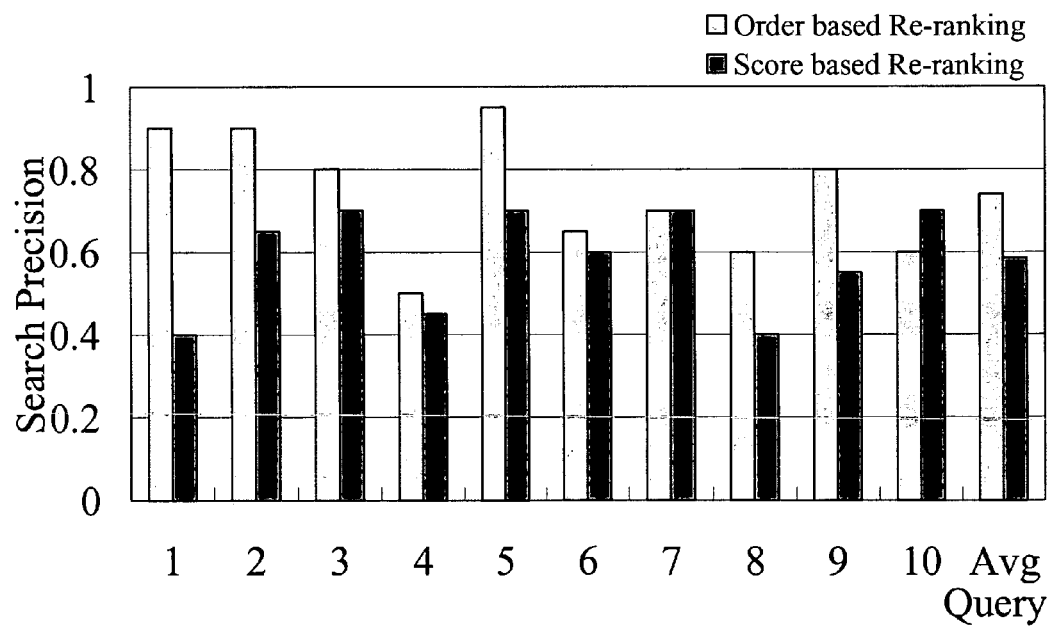
FIG. 18 illustrates the precision of various re-ranking methods.

The last experiment in this working example is to measure the different re-ranking techniques, namely, the score-based re-ranking technique and the order-based re-ranking technique. The 7 volunteers were asked to test on the same 10 queries as above and calculated the average precision for the top 30 documents. FIG. 18 illustrates the precision of various re-ranking techniques. As can be seen in FIG. 18, the order-based re-ranking outperforms the score-based re-ranking. In this working example, it was noticed that few of results have high similarity score and PageRank score and there is little difference between similarity and PageRank scores among search results. Therefore, a linear combination of the similarity score cannot achieve good results.

Probabilistic Analysis

Numerous redundant pairs other than real implicit links may also be included because the user's browsing has to follow the explicit links. However, based on statistical analysis, this effect is small. Specifically, if the connectivity in a small web is high and the users have no significant bias in selecting paths, implicit links could be separated from explicit links by setting an appropriate minimum support.

To obtain insight on how the redundant pairs in affect the mining result, the following probabilistic analysis was conducted. For the simplicity of explanation, assume that the explicit graph G is a completely connected graph. In other words, every page has hyperlinks to all other pages. Thus the number of implicit links is far less than the number of explicit links (i.e. $|E'|<<|E|$). Furthermore, assume that each web-page occurs only once in an explicit path, such that users never visit a same web-page in a session. Elaborating on the explicit path generation, for an adjacent pair $(w_i, w_j)$ in the implicit path, start from the page $w_i$ and select web-pages one by one according to the following random process.

(a) Select the target page $w_j$ with probability p (0<p<1); select another page $w_x \neq w_j$, $w_i$ with probability 1−p.

(b) If arrived at $w_j$, stop; else go to (a).

For explicit paths of different lengths, the probabilities could be easily calculated as in Table 1, where $w_{x1}$, $w_{x2}$, ... $\neq w_i$, $w_j$ and $w_{x1}$, $w_{x2}$, ... are different from each other. Thus, the probability that an arbitrary explicit link $I_{x,y}$ is included in the path is about $[(1-p)^2 p + (1-p)^3 p + (1-p)^4 p + \ldots]/n^2 = (1-p)^2/n^2$ where n=|V| and $n^2$ is the number of distinct pairs (n>>2). This probability is calculated given current implicit link $I_{i,j}$ whose probability is $P(w_j|w_i)P(w_i)$, thus the probability of having a path containing $w_i$, $w_x$, $w_y$, and $w_j$ in this order is $P(w_j|w_i)P(w_i)(1-p)^2/n^2$. Intuitively, this joint probability is the contribution of implicit link $I_{i,j}$ to the probability of explicit link $I_{x,y}$.

For the same explicit link $I_{x,y}$, the contributions of all the implicit links can be summed to get the total probability of this explicit link $P(w_y|w_x)P(w_x) \approx (1-p)^2/n^2$. Here, the contribution of implicit links is ignored, with one end being $w_x$ or $w_y$ because $|E'|<<|E|$. Compared to explicit link probability, the average probability of an implicit link $I_{i,j}$ is $P(w_j|w_i)P(w_i) \approx 1/n^2$. In other words, the average probability of explicit links is about $(1-p)^2$ of that of implicit links. Thus by two-item sequential pattern mining, implicit links could be separated from explicit links by setting an appropriate minimum support. Furthermore, if the variance of implicit link probabilities are relatively larger than the variance of explicit link probabilities (i.e., the users have no significant bias in selecting paths), most two-item access patterns obtained from web log mining with the highest support values will be implicit links.

The above analysis is based on a strict assumption that the explicit link graph is completely connected. This assumption is generally not true in practice. However, if the connectivity in a small web is high, the mining result will still be satisfactory. In some small webs, the existence of a search page or a site map dramatically increases the connectivity of a web site.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A computer-readable storage medium having stored and encoded thereon computer-executable instructions for performing on a computing device an enhanced local search of web sites and intranets by mining user access logs, comprising:

segmenting the user access log into different browsing sessions;
generating ordered pairs of pages from the browsing sessions to find implicit links by using a gliding window to move over explicit paths of the browsing sessions to generate the ordered pairs of pages;
determining a frequency of each of the ordered pairs;
defining a minimum support threshold;
applying the minimum support threshold to the frequency of each of the ordered pairs;
filtering the ordered pairs to remove any ordered pairs that are infrequently occurring;
constructing an implicit links graph from the implicit links;
generating two-item sequential patterns from the ordered pairs;
updating the implicit links graph using the two-item sequential patterns;
re-ranking search results obtained from a search engine to enhance the local searching to produce updated search results; and
displaying the updated search results to a user.

2. The computer-readable storage medium of claim 1, further comprising pre-processing the user access log using at least one of: (a) data cleaning; (b) browsing session identification; (c) consecutive repetition elimination.

3. The computer-readable storage medium of claim 1, further comprising identifying each individual ones of the browsing sessions.

4. The computer-readable storage medium of claim 3, further comprising identifying in terms of a user identification and a chronological order of pages.

5. The computer-readable storage medium of claim 1, further comprising defining the gliding window size, wherein the size represents a maximum interval a user clicks between a source page and a target page.

6. The computer-readable storage medium of claim 1, further comprising discarding an ordered pair if its frequency is below the minimum support threshold.

7. The computer-readable storage medium of claim 1, further comprising keeping an ordered pair if its frequency is above the minimum support threshold.

8. A computer-implemented method contained on computer-readable storage media having stored and encoded thereon computer-executable instructions for execution on a general-purpose computing device for enhancing initial search results of a search engine performing a local search of a web sub-space using a user access log, comprising:

using the general-purpose computing device to perform the following process actions:
pre-processing the user access log;
segmenting the log into browsing sessions;
generating ordered pairs of implicit links from the browsing sessions;
filtering the ordered pairs using a minimum support threshold to remove any infrequently occurring ordered pairs to generate two-item sequential patterns;
updating an implicit links graph using the two-item sequential patterns;
defining an adjacency matrix to describe the updated implicit links graph;
defining a modified re-ranking formula in terms of the adjacency matrix;
modifying the re-ranking formula using a random walk technique;
re-ranking the initial search results using the updated implicit links graph to generate enhanced search results; and
displaying the enhanced search results to a user.

9. The computer-implemented method as set forth in claim 8, further comprising discarding any ordered pairs having a frequency below the minimum support threshold.

10. The computer-implemented method as set forth in claim 8, further comprising keeping any ordered pairs having a frequency above the minimum support threshold.

11. The computer-implemented method as set forth in claim 8, further comprising computing a page rank using the adjacency matrix.

12. The computer-implemented method as set forth in claim 8, further comprising discarding any ordered pairs having a frequency below the minimum support threshold.

13. The computer-implemented method as set forth in claim 12, wherein the random walk technique further comprises a probability parameter.

14. The computer-implemented method as set forth in claim 8, wherein re-ranking further comprises using an order-based re-ranking technique.

15. The computer-implemented method as set forth in claim 14, wherein the order-based re-ranking technique further comprises using a linear combination of page positions contained on two lists.

16. The computer-implemented method as set forth in claim 15, wherein one of the two lists is sorted by similarity scores.

17. The computer-implemented method as set forth in claim 15, wherein one of the lists is sorted by PageRank values.

18. The computer-implemented method as set forth in claim 8, wherein re-ranking further comprises using an score-based re-ranking technique.

19. The computer-implemented method as set forth in claim 18, wherein the score-based re-ranking technique further comprises using a linear combination of a content-based similarity score and a PageRank value of all pages.

* * * * *